United States Patent
Shintani

(10) Patent No.: US 8,503,855 B2
(45) Date of Patent: *Aug. 6, 2013

(54) IMAGE PROCESSING APPARATUS, CONTROL METHOD THEREFOR, AND PROGRAM

(75) Inventor: Takuya Shintani, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 808 days.

This patent is subject to a terminal disclaimer.

(21) Appl. No.: 12/411,968

(22) Filed: Mar. 26, 2009

(65) Prior Publication Data

US 2009/0263099 A1   Oct. 22, 2009

(30) Foreign Application Priority Data

Apr. 21, 2008   (JP) ................................. 2008-110472

(51) Int. Cl.
*H04N 5/94* (2006.01)
*H04N 9/88* (2006.01)

(52) U.S. Cl.
USPC .............................. 386/52; 386/263; 386/264

(58) Field of Classification Search
USPC ........................................... 386/52, 263–264
See application file for complete search history.

(56) References Cited

U.S. PATENT DOCUMENTS

| | | | |
|---|---|---|---|
| 7,843,494 B2 * | 11/2010 | Uemura et al. ............ | 348/222.1 |
| 2002/0061142 A1 * | 5/2002 | Hiramatsu .................... | 382/254 |
| 2005/0068446 A1 * | 3/2005 | Steinberg et al. ............ | 348/335 |
| 2008/0158406 A1 | 7/2008 | Ito | |

FOREIGN PATENT DOCUMENTS

| | | |
|---|---|---|
| CN | 101001319 A | 7/2007 |
| JP | 06-105241 | 4/1994 |
| JP | 2001-223894 | 8/2001 |
| JP | 2003-289495 | 10/2003 |
| JP | 2004-242158 | 8/2004 |

OTHER PUBLICATIONS

The above foreign patent document was cited in a Feb. 18, 2011 Chinese Office Action, which is enclosed with an English Translation, that issued in Chinese Patent Application No. 200910135544.8.

* cited by examiner

*Primary Examiner* — Carl Colin
*Assistant Examiner* — John Elmore
(74) *Attorney, Agent, or Firm* — Cowan, Liebowitz & Latman, P.C.

(57) ABSTRACT

An image processing apparatus includes an input unit which receives, from an image capturing apparatus, moving image data in which the shadow of a foreign substance adhered to the surface of an optical member is captured, an obtaining unit which obtains, from the moving image data, foreign substance information including information of the position and size of the foreign substance captured in the moving image data, a playback unit which can play back the moving image data while correcting the shadow of the foreign substance in the moving image data by using the foreign substance information, a display unit which displays an image played back by the playback unit, and a setting unit which sets, in accordance with the playback status of the moving image data, whether to perform processing of correcting the shadow of the foreign substance in each frame of the moving image data.

17 Claims, 22 Drawing Sheets

| PARAMETERS | SETTINGS |
|---|---|
| APERTURE VALUE | F22 |
| ISO | 400 |
| SHUTTER SPEED | 1/30 |
| PHOTOMETRY MODE | AVERAGE PHOTOMETRY |
| ELECTRONIC FLASH | INHIBITED |
| EXPOSURE COMPENSATION | INHIBITED |
| AF MODE | MANUAL |

FIG. 14

| ADDRESS OFFSET (Hex) | CODE (Hex) | MEANING |
| --- | --- | --- |
| +00 | FF | Prefix |
| +01 | E0 | |
| +02 | | F-NUMBER (NUMERATOR) |
| +04 | | F-NUMBER (DENOMINATOR) |
| +06 | | LENS PUPIL POSITION (NUMERATOR) |
| +08 | | LENS PUPIL POSITION (DENOMINATOR) |
| +0A | | NUMBER OF DUST REGIONS |
| +0C | | PARAMETERS OF DUST REGION $D_1$<br><br>RADIUS (2 BYTES)<br>X-COORDINATE OF CENTER (2 BYTES)<br>Y-COORDINATE OF CENTER (2 BYTES) |
| | | PARAMETERS OF DUST REGION $D_2$ |
| | | ... |
| | | PARAMETERS OF DUST REGION $D_n$ |

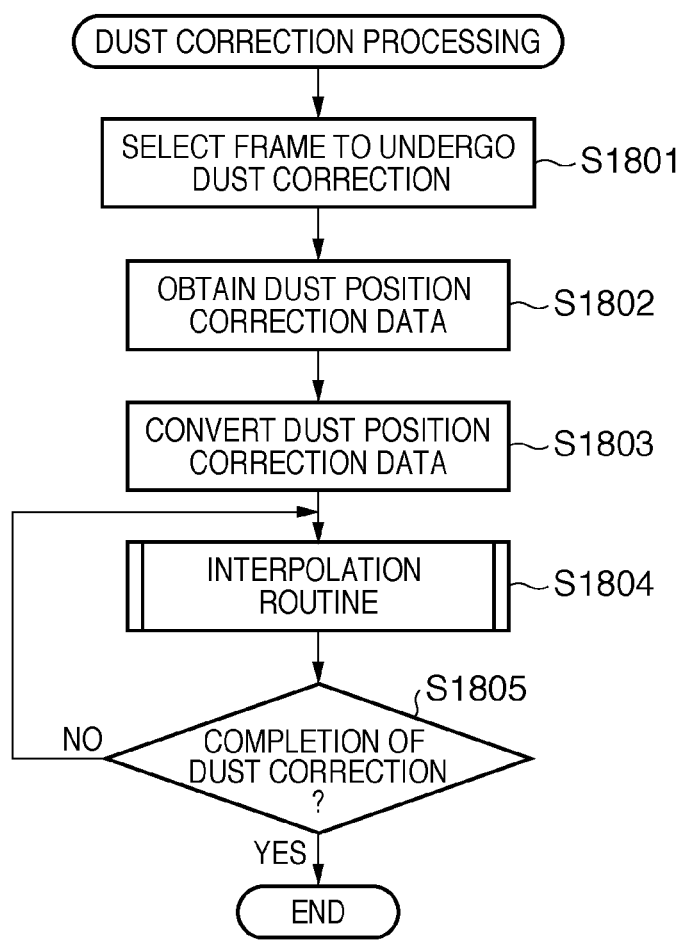
F I G. 18

IMAGE PROCESSING APPARATUS, CONTROL METHOD THEREFOR, AND PROGRAM

BACKGROUND OF THE INVENTION

1. Field of the Invention

The present invention relates to a technique of playing back moving image data of an MPEG format using inter-frame encoding.

2. Description of the Related Art

Recently, a demand has arisen for a technique of handling moving image information as digital data, and encoding it at high compression ratio with high quality for use in accumulation and transmission. For image information compression, methods such as MPEG for compression-encoding image information by orthogonal transform (e.g., discrete cosine transform), motion prediction, and motion compensation using redundancy unique to moving image information have been proposed and become popular.

Manufacturers have developed and commercialized image capturing apparatuses (e.g., a digital camera and digital video camera), DVD recorders, and the like capable of recording images using these encoding methods. Users can easily view images using these apparatuses, personal computers, DVD players, and the like.

These days, H.264 (MPEG4-Part10 AVC) is available as an encoding method aiming at higher compression ratios and higher image qualities. It is known that H.264 requires larger calculation amounts for encoding and decoding than those in conventional encoding methods such as MPEG-2 and MPEG-4, but can achieve higher encoding efficiencies (see ISO/IEC 14496-10, "Advanced Video Coding").

FIG. 1 is a block diagram showing the arrangement of an image processing apparatus which compresses image data by H.264. In FIG. 1, input image data is divided into macroblocks, which are sent to a subtracter 1101. The subtracter 1101 calculates the difference between image data and a predicted value, and outputs it to an integer DCT (Discrete Cosine Transform) transform unit 1102. The integer DCT transform unit 1102 executes integer DCT transform for the input data, and outputs the transformed data to a quantization unit 1103. The quantization unit 1103 quantizes the input data. The quantized data is sent as difference image data to an entropy encoder 1115, while it is inversely quantized by an inverse quantization unit 1104, and undergoes inverse integer DCT transform by an inverse integer DCT transform unit 1105. An adder 1106 adds a predicted value to the inversely transformed data, reconstructing an image.

The reconstructed image is sent to a frame memory 1107 for intra (intra-frame) prediction, while it undergoes deblocking filter processing by a deblocking filter 1109, and then is sent to a frame memory 1110 for inter (inter-frame) prediction. The image in the intra prediction frame memory 1107 is used for intra prediction by an intra prediction unit 1108. The intra prediction uses the value of a pixel adjacent to an encoded block as a predicted value.

The image in the inter prediction frame memory 1110 is formed from a plurality of pictures, as will be described later. A plurality of pictures is classified into two lists "List0" and "List1". A plurality of pictures classified into the two lists is used for inter prediction by an inter prediction unit 1111. After the inter prediction, a memory controller 1113 updates internal images. In the inter prediction by the inter prediction unit 1111, a predicted image is determined using an optimal motion vector based on the result of motion detection between image data of different frames by a motion detection unit 1112.

As a result of intra prediction and inter prediction, a selector 1114 selects an optimal prediction result. The motion vector is sent to the entropy encoder 1115, and encoded together with the difference image data, forming an output bit stream.

H.264 inter prediction will be explained in detail with reference to FIG. 2 to FIG. 5.

The H.264 inter prediction can use a plurality of pictures for prediction. Hence, two lists ("List0" and "List1") are prepared to specify a reference picture. A maximum of five reference pictures can be assigned to each list.

P-pictures use only "List0" to mainly perform forward prediction. B-pictures use "List0" and "List1" to perform bidirectional prediction (or only forward or backward prediction). That is, "List0" holds pictures mainly for forward prediction, and "List1" holds pictures mainly for backward prediction.

FIG. 2 shows an example of a reference list used in encoding. This example assumes that the ratio of I-, P-, and B-pictures is a standard one, that is, I-pictures are arranged at an interval of 15 frames, P-pictures are arranged at an interval of three frames, and B-pictures between I- and P-pictures are arranged at an interval of two frames. In FIG. 2, image data 1201 is obtained by arranging pictures in the display order. Each square in the image data 1201 describes the type of picture and a number representing the display order. For example, a picture I15 is an I-picture whose display order is 15, and is used for only intra prediction. A picture P18 is a P-picture whose display order is 18, and is used for only forward prediction. A picture B16 is a B-picture whose display order is 16, and is used for bidirectional prediction.

The encoding order is different from the display order, and data are encoded in the prediction order. In FIG. 2, data are encoded in the order of "I15, P18, B16, B17, P21, B19, B20, . . . ".

In FIG. 2, a reference list (List0) 1202 holds temporarily encoded/decoded pictures. For example, inter prediction using a picture P21 (P-picture whose display order is 21) refers to pictures which have been encoded and decoded in the reference list (List0) 1202. In the example shown in FIG. 2, the reference list 1202 holds pictures P06, P09, P12, I15, and P18.

In inter prediction, a motion vector having an optimal predicted value is obtained for each macroblock from reference pictures in the reference list (List0) 1202, and encoded. Pictures in the reference list (List0) 1202 are sequentially given reference picture numbers, and discriminated (separately from numbers shown in FIG. 2).

After the end of encoding the picture P21, the picture P21 is newly decoded and added to the reference list (List0) 1202. The oldest reference picture (in this case, the picture P06) is deleted from the reference list (List0) 1202. Encoding proceeds in the order of pictures B19, B20, and P24. FIG. 3 shows the state of the reference list (List0) 1202 at this time.

FIG. 4 shows a change of the reference list for each picture. In FIG. 4, pictures are encoded sequentially from the top. FIG. 4 shows a picture during encoding and the contents of the reference lists (List0 and List1) for it. When a P-picture (or I-picture) is encoded as shown in FIG. 4, the reference lists (List0 and List1) are updated to delete the oldest pictures from the reference lists (List0 and List1). In this example, the reference list (List1) holds only one picture. This is because, if the number of pictures referred to for backward prediction increases, the buffer amount till decoding also increases. In other words, backward pictures excessively distant from a picture during encoding are not referred to.

In this example, I- and P-pictures are referred to, and all I- and P-pictures are sequentially added to the reference lists (List0 and List1). Only I-pictures are used in the reference list (List1) for backward prediction because this picture arrangement is considered to be the most popular one. However, the picture arrangement in the reference list is merely an example of the most popular one, and H.264 itself has a high degree of freedom for the configuration of the reference list.

For example, not all I- and P-pictures need be added to the reference list, and B-pictures can also be added to the reference list. Also, H.264 defines a long-term reference list of pictures which stay in the reference list until an explicit instruction is received. FIG. 5 shows a change of the reference list when adding B-pictures to the reference list. When adding B-pictures to the reference list, encoded pictures may be added to the reference list every time all B-pictures are encoded.

A file format for recording moving image data compressed in this way will be explained.

As described above, the MP4 (MPEG-4) film format is used as a general-purpose format for recording MPEG (MPEG-2 or MPEG-4 format) image data obtained by a digital video camera, digital still camera, or the like. The MP4 file format ensures compatibility with other digital devices to, for example, play back image data recorded as an MP4 file.

As represented by a of FIG. 6, an MP4 file is basically formed from an mdat box which holds encoded stream image data, and a moov box which holds stream image data-related information. The mdat box is formed from a plurality of chunks (chunk cN), as represented by b of FIG. 6. Each chunk is formed from a plurality of samples (sample sM), as represented by d of FIG. 6. For example, the respective samples sample s1, sample s2, sample s3, sample s4, . . . correspond to encoded MPEG image data $I_0, B_{-2}, B_{-1}, P_3, \ldots$, as represented by e of FIG. 6.

$I_0, I_1, I_2, \ldots, I_n$ represent intra-encoded (intra-frame-encoded) frame image data. $B_0, B_1, B_2, \ldots, B_n$ represent frame image data encoded (inter-frame-encoded) by referring to reference image data bidirectionally. $P_0, P_1, P_2, \ldots, P_n$ represent frame image data encoded (inter-frame-encoded) by referring to reference image data unidirectionally (forward direction). These frame image data are variable-length encoded data.

As represented by c of FIG. 6, the moov box is formed from an mvhd box which holds header information recording the creation date and time, and the like, and a trak box which holds information on stream image data stored in the mdat box. Information stored in the trak box includes an stco box which stores information of an offset value for each chunk of the mdat box, as represented by h of FIG. 6, an stsc box which stores information of the number of samples in each chunk, as represented by g of FIG. 6, and an stsz box which stores information of the size of each sample, as represented by f of FIG. 6.

The amounts of data stored in the stco box, stsc box, and stsz box increase together with the recorded image data amount, that is, the recording time. For example, when an image of 30 frames per sec is recorded as an MP4 file by storing every 15 frames in one chunk, the data amount increases to 1 Mbyte for 2 h, requiring a moov box having a capacity of 1 Mbyte.

When playing back this MP4 file, the moov box of the MP4 file is read out from the recording medium, the stco, stsc and stsz boxes are analyzed from the moov box, and then each chunk in the mdat box can be accessed.

When recording an image in the MP4 file format, the stream data increases over time. Since the size of stream data is very large, the stream data needs to be written in the file even during recording. However, the size of the moov box also increases in accordance with the recording time, as described above. The size of the MP4 header is not defined till the end of recording, so the write offset position of stream data in the file cannot be determined. For this reason, recording by a general moving image processing apparatus adopts the following measures using the flexibility of the MP4 file format.

(1) The mdat box is arranged at the start of a file, and after recoding ends, the moov box is arranged next to the mdat box (FIG. 7A).

(2) As proposed in Japanese Patent Laid-Open No. 2003-289495, the size of the moov box is determined in advance to determine the offset position of the mdat box, and then recording is done (FIG. 7B). Even when the recording time is short and the header area does not become full, the area remains as a free box. When recording data over the header size, the data is recorded by properly decimating frame number information of I-pictures, maintaining the header size at a predetermined size.

(3) A pair of moov and mdat boxes is divided into a plurality of pairs to arrange them (FIG. 7C). The second and subsequent header areas are called moof boxes.

These are the structures of general MP4 files.

A general playback method for the MP4 file will be described below.

FIG. 8 is a block diagram showing an example of the basic arrangement of a moving image playback apparatus which plays back a moving image compression-encoded by H.264.

In FIG. 8, the moving image playback apparatus includes a recording medium 801, a playback circuit 802 which plays back data from a recording medium, a buffer circuit 803, a variable-length decoding circuit 804, an inverse quantization circuit 805, an inverse DCT circuit 806, an addition circuit 807, a memory 808, a motion compensation circuit 809, a switching circuit 810, a rearrangement circuit 811, an output terminal 812, a header information analysis circuit 813, a playback control circuit 814, and a control signal input terminal 815.

The sequence of playback processing in the moving image playback apparatus in FIG. 8 will be explained.

Upon receiving an instruction from the playback control circuit 814, the playback circuit 802 plays back an MP4 file recorded on the recording medium 801, and starts supplying it to the buffer circuit 803. At the same time, the playback control circuit 814 controls the header information analysis circuit 813 to analyze an offset, chunk information, and sample information in the stco box, stsc box, and stsz box representing storage statuses in mdat in the moov box. The playback control circuit 814 controls the playback circuit 802 to start playing back stream image data in the mdat box from the recording medium 801.

The playback circuit 802 plays back, from the start address, the stream image data in the mdat box of the file recorded on the recording medium 801, and supplies it to the buffer circuit 803. Read of the stream image data stored in the buffer circuit 803 starts in accordance with the occupancy of the buffer circuit 803 and the like, supplying the stream image data to the variable-length decoding circuit 804. The variable-length decoding circuit 804 executes variable-length decoding for the played-back stream image data supplied from the buffer circuit 803, and supplies the decoded stream image data to the inverse quantization circuit 805.

The inverse quantization circuit 805 inversely quantizes the stream image data which has undergone variable-length decoding and has been supplied from the variable-length decoding circuit 804. The inverse quantization circuit 805 supplies the inversely quantized stream image data to the inverse DCT circuit 806. The inverse DCT circuit 806 executes inverse DCT for the inversely quantized data supplied from the inverse quantization circuit 805, and supplies the inverse DCT data to the addition circuit 807. The addition circuit 807 adds the inverse DCT data supplied from the inverse DCT circuit 806, and data supplied from the switching circuit 810.

Of stream image data played back from the recording medium 801, intra-frame-encoded data $I_0$ of GOP0 (Group Of Picture) is played back first, as shown in FIG. 9. The playback control circuit 814 controls to select the terminal a of the switching circuit 810, and the switching circuit 810 supplies data "0" to the addition circuit 807. The addition circuit 807 adds data "0" supplied from the switching circuit 810, and inverse DCT data supplied from the inverse DCT circuit 806, and supplies the added data as a played-back frame $F_0$ to the memory 808 and rearrangement circuit 811. The memory 808 stores the added data supplied from the addition circuit 807.

Bidirectionally predictive-encoded picture data $B_{-2}$ and $B_{-1}$ are played back next to the intra-frame-encoded data $I_0$ of GOP0. The playback sequence up to the inverse DCT circuit 806 is the same as that described for the intra-frame-encoded data $I_0$, and a description thereof will not be repeated.

The inverse DCT circuit 806 supplies bidirectionally predictive-encoded inverse DCT image data to the addition circuit 807. At this time, the playback control circuit 814 controls the switching circuit 810 so that the movable terminal c of the switching circuit 810 selects the fixed terminal b. Data from the motion compensation circuit 809 is supplied to the addition circuit 807.

The motion compensation circuit 809 detects a motion vector which has been generated in encoding from played-back stream image data and recorded in the stream image data. The motion compensation circuit 809 reads out data of a reference block (in this case, only data from the played-back intra-frame-encoded data $F_0$ because recording has just started) from the memory 808, and supplies it to the movable terminal c of the switching circuit 810.

The addition circuit 807 adds inverse DCT data supplied from the inverse DCT circuit 806, and motion-compensated data supplied from the switching circuit 810, supplying the added data as played-back frames $F_{-2}$ and $F_{-1}$ to the rearrangement circuit 811.

Then, unidirectionally predictive-encoded picture data $P_3$ is played back. The playback sequence up to the inverse DCT circuit 806 is the same as that described for the intra-frame-encoded data $I_0$, and a description thereof will not be repeated.

The inverse DCT circuit 806 supplies inverse DCT picture data to the addition circuit 807. At this time, the playback control circuit 814 controls the switching circuit 810 so that the movable terminal c of the switching circuit 810 selects the fixed terminal b. Data from the motion compensation circuit 809 is supplied to the addition circuit 807.

The motion compensation circuit 809 detects a motion vector which has been generated in encoding from played-back stream image data and recorded in the stream image data. The motion compensation circuit 809 reads out data of a reference block (in this case, data from the played-back intra-frame-encoded data $F_0$) from the memory 808, and supplies it to the movable terminal c of the switching circuit 810.

The addition circuit 807 adds inverse DCT data supplied from the inverse DCT circuit 806, and motion-compensated data supplied from the switching circuit 810, supplying the added data as a played-back frame $F_3$ to the memory 808 and the rearrangement circuit 811. The memory 808 stores the added data supplied from the addition circuit 807.

Then, pictures $B_1$ and $B_2$ are played back. These pictures are not frames at the start of recoding, and thus are played back by the same sequence as that described for the above-mentioned pictures $B_{-2}$ and $B_{-1}$ except that they are played back from the frames $F_0$ and $F_3$ by bidirectional prediction. In the above-described way, $P_6$, $B_4$, $B_5$, . . . are sequentially played back.

The rearrangement circuit 811 rearranges the sequentially played-back frames $F_0, F_{-2}, F_{-1}, F_3, F_1, F_2, F_6, F_4, F_5, \ldots$ into $F_{-2}, F_{-1}, F_0, F_1, F_2, F_3, F_4, F_5, F_6, \ldots$, and outputs the rearranged frames to the output terminal 812.

At the start of playing back the file, the header information analysis circuit 813 analyzes an offset, chunk information, and sample information from the stco box, stsc box, and stsz box representing storage statuses in mdat in the moov box of the MP4 file. The playback control circuit 814 operates to skip data till GOP1, and start playing back data from GOP1.

In a lens-interchangeable digital camera, when the lens is detached from the camera body, mote floating in air may enter the camera body. The camera incorporates various mechanical units such as a shutter mechanism which mechanically operate. When these mechanical units operate, dust such as metal powder may be generated in the camera body.

When a foreign substance such as dust or mote adheres to the surface of an image sensor which forms the image capturing unit of a digital camera, the shadow of the foreign substance is captured in a sensed image, degrading the quality of the sensed image.

To solve this problem, there is proposed a method of correcting a pixel capturing the shadow of a foreign substance by using the signals of neighboring pixels or the like.

As a technique of correcting the shadow of a foreign substance, for example, Japanese Patent Laid-Open No. 2003-289495 proposes an image defect correction method of correcting the pixel defect of an image sensor.

Japanese Patent Laid-Open No. 6-105241 proposes a method for simplifying setting of position information of a pixel defect. More specifically, the extension of an image file recorded in the dust obtaining mode is changed from that of a normal image, and the PC automatically discriminates a dust information image. By using this information, a target image is corrected.

Some products record the dust information as photographing information in a recorded image file, and correct a target image using the information.

Japanese Patent Laid-Open No. 2004-242158 discloses a related technique.

However, when a moving image file like the above-described MP4 file is played back while correcting a target image on the basis of the dust information, the amount of used memory increases, and the quality of moving image playback degrades owing to a decrease in operating speed.

In still image playback, a dust-corrected still image is played back, so it suffices to execute dust correction once per image. Even if dust correction processing takes a long time under the limitation of the memory or the like, playback of a still image can wait until the completion of dust correction processing.

However, in moving image playback, the motion of an image is expressed by continuously playing back a plurality of still images such as 15 or 30 frames per sec. In addition to general playback processing, dust correction processing needs to be executed 15 times for 15 frames per sec or 30 times for 30 frames. No natural moving image playback can be achieved unless the processing ends within the limited time. A moving image may be played back without performing dust correction when no natural moving image playback can be done. As a result, a poor image in which no dust is corrected may be displayed in still image display upon pause or frame advance in which the user views an image carefully for a long time during moving image playback.

SUMMARY OF THE INVENTION

The present invention has been made to overcome the conventional drawbacks, and suppress degradation of the quality of a display image when performing an operation such as pause or frame advance during moving image playback.

According to the first aspect of the present invention, there is provided an image processing apparatus which plays back moving image data output from an image capturing unit having an image sensor for capturing an object image and an optical member arranged in front of the image sensor, the apparatus including an input unit which receives, from the image capturing unit, moving image data in which the shadow of a foreign substance adhered to the surface of the optical member is captured, an obtaining unit which obtains, from the moving image data, foreign substance information including information of the position and size of the foreign substance captured in the moving image data by the image capturing unit, a playback unit which can play back the moving image data while correcting the shadow of the foreign substance in the moving image data by using the foreign substance information obtained by the obtaining unit, a display unit which displays an image played back by the playback unit, and a setting unit which sets, in accordance with the playback status of the moving image data, whether to perform processing of correcting the shadow of the foreign substance in each frame of the moving image data.

According to the second aspect of the present invention, there is also provided a method of controlling an image processing apparatus which plays back moving image data output from an image capturing unit having an image sensor for capturing an object image and an optical member arranged in front of the image sensor, the method including an input step of receiving, from the image capturing unit, moving image data in which the shadow of a foreign substance adhered to the surface of the optical member is captured, an obtaining step of obtaining, from the moving image data, foreign substance information including information of the position and size of the foreign substance captured in the moving image data by the image capturing unit, a playback step of playing back the moving image data while correcting or not correcting the shadow of the foreign substance in the moving image data by using the foreign substance information obtained in the obtaining step, a display step of displaying an image played back in the playback step, and a setting step of setting, in accordance with the playback status of the moving image data, whether to perform processing of correcting the shadow of the foreign substance in each frame of the moving image data.

Further features of the present invention will become apparent from the following description of exemplary embodiments with reference to the attached drawings.

BRIEF DESCRIPTION OF THE DRAWINGS

FIG. 14 is a view showing an example of the data format of dust correction data;

FIG. 18 is a flowchart for explaining details of dust correction processing;

DESCRIPTION OF THE EMBODIMENTS

Preferred embodiments of the present invention will be described in detail below with reference to the accompanying drawings.

First Embodiment

The arrangement of an image capturing apparatus common to embodiments of the present invention will be explained with reference to FIG. 10.

In the embodiment, a lens-interchangeable single-lens reflex digital still camera will be exemplified as the image capturing apparatus. The present invention is also applicable to, for example, a lens-interchangeable digital video camera.

Figure 1:
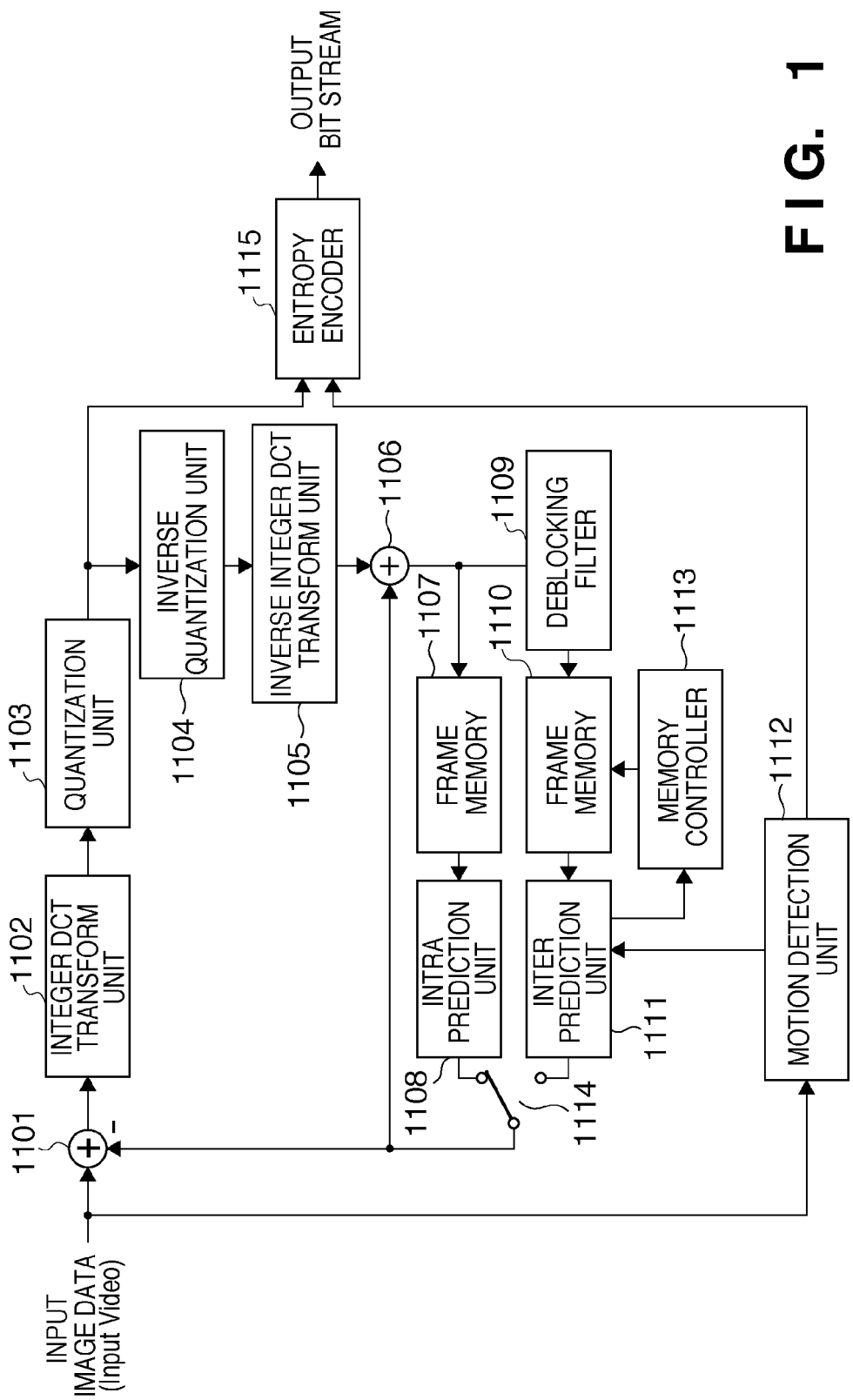
FIG. 1 is a block diagram showing the arrangement of a conventional image processing apparatus.
Figure 2:
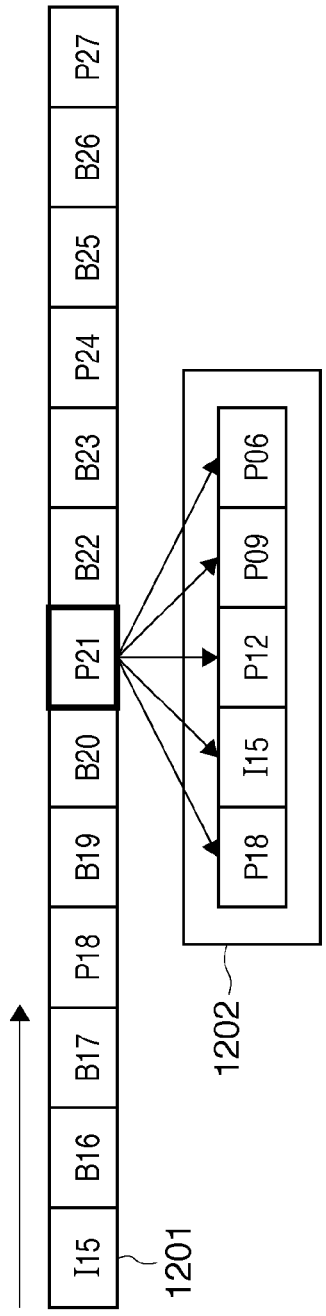
FIG. 2 is a view showing an example of a reference list when encoding a picture P21.
Figure 3:
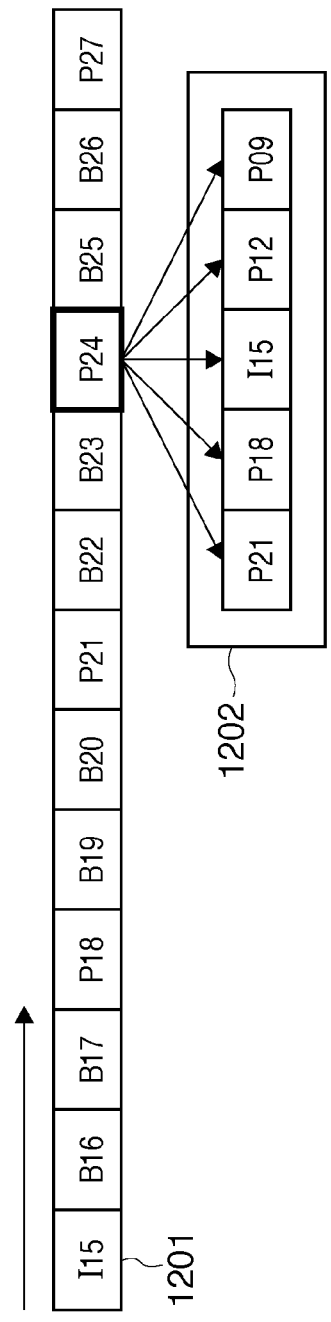
FIG. 3 is a view showing an example of a reference list when encoding a picture P24.
Figure 4:
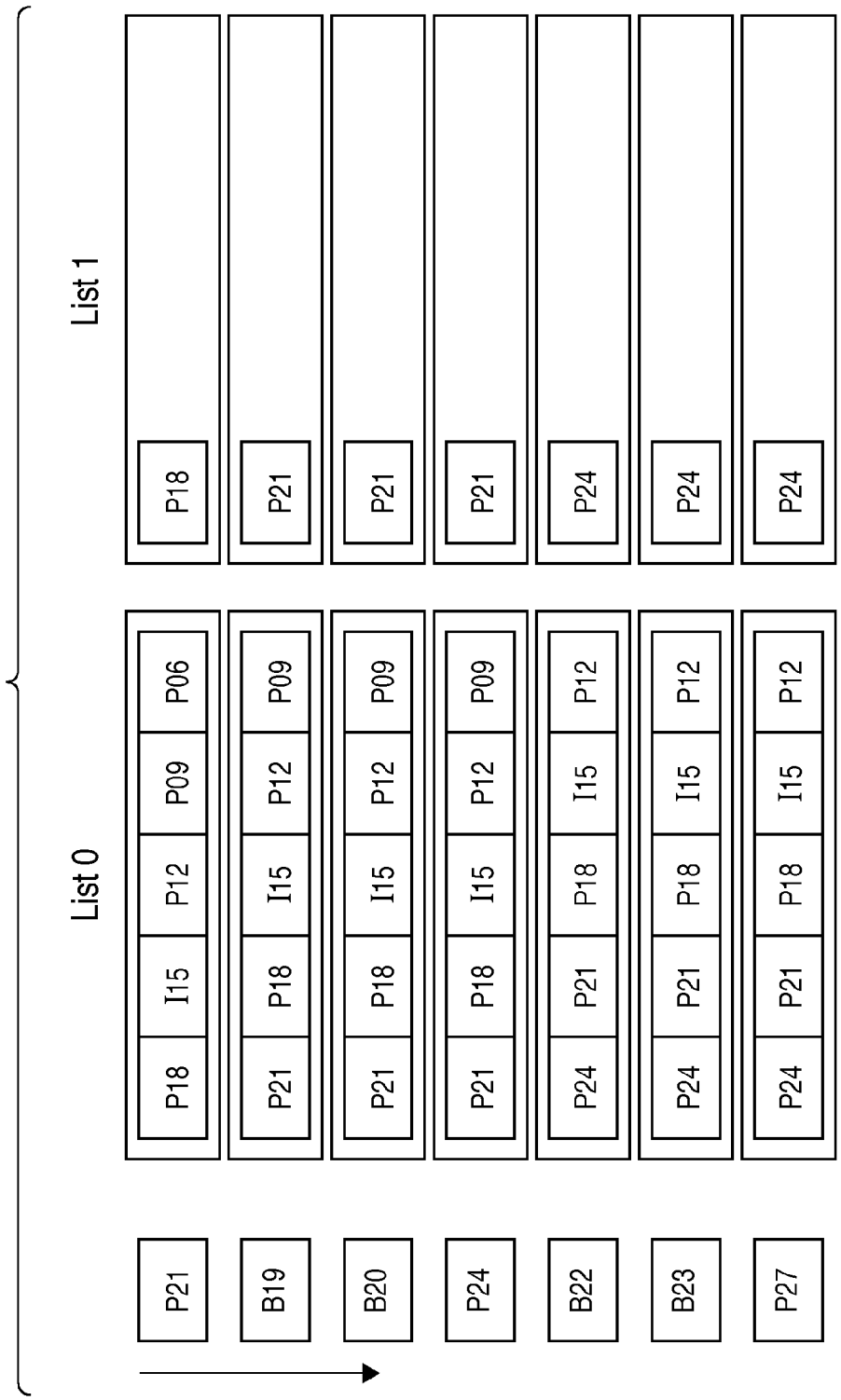
FIG. 4 is a view showing a change of the reference list for each picture.
Figure 5:
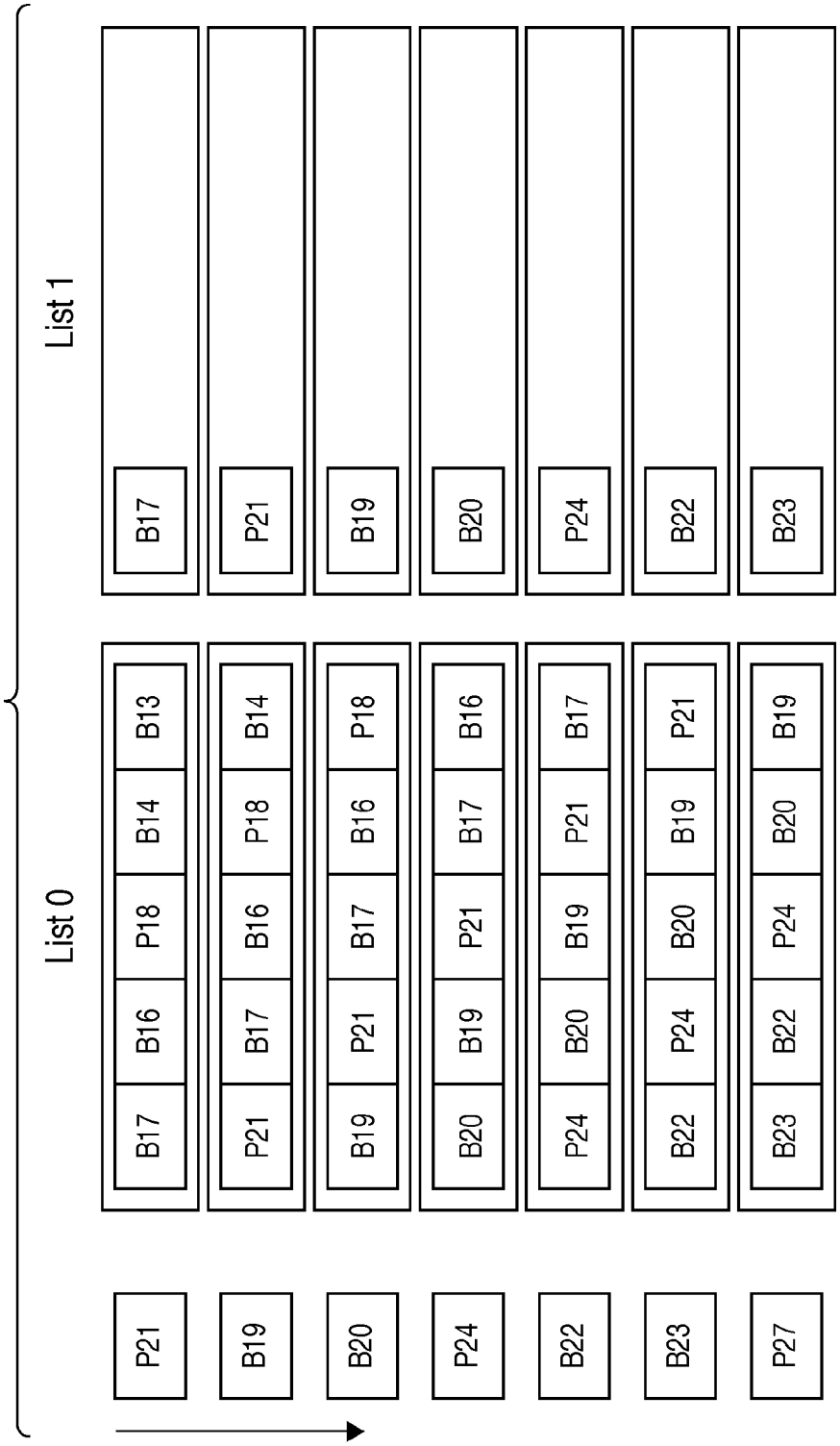
FIG. 5 is a view showing a change of the reference list when adding B-pictures to the reference list.
Figure 6:
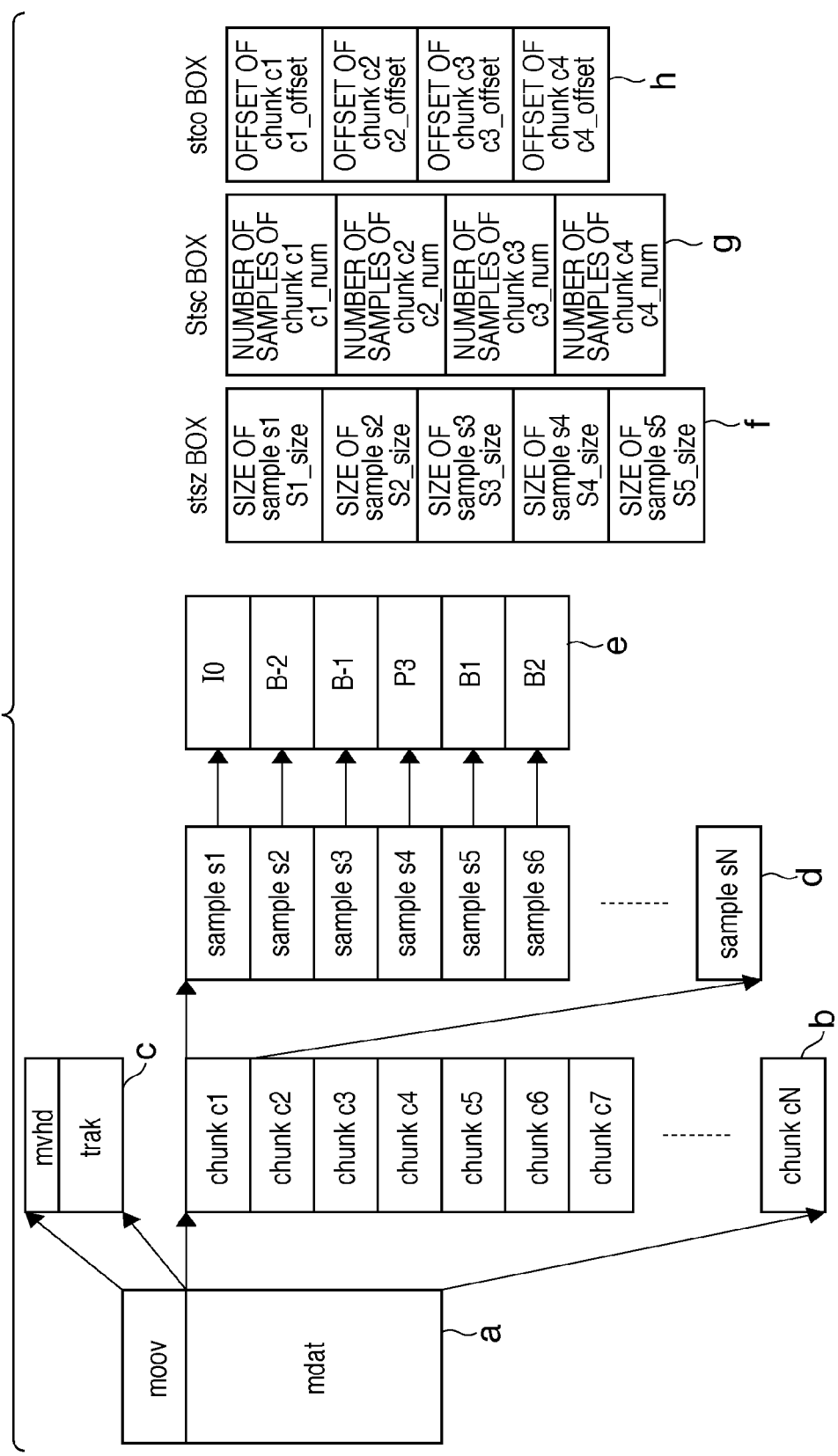
FIG. 6 is a view for explaining the structure of an MP4 file.
Figure 7:
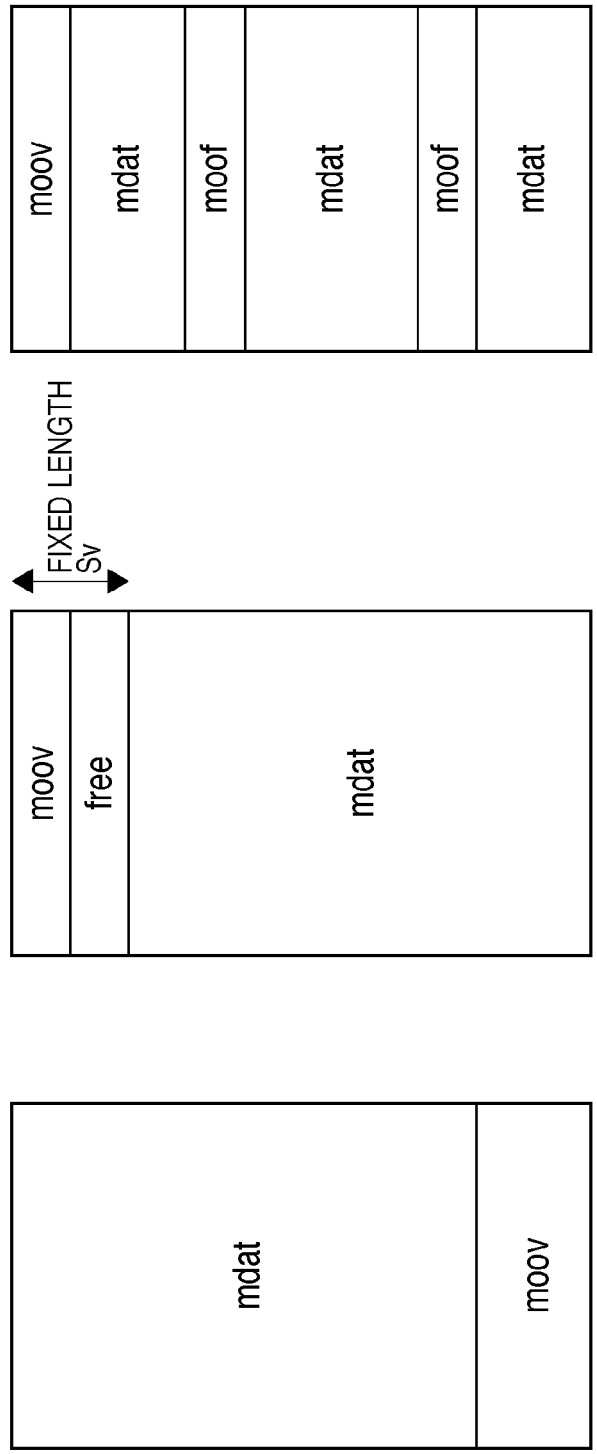
FIG. 7A to FIG. 7C are views showing examples of the structure of an MP4 file.
Figure 8:
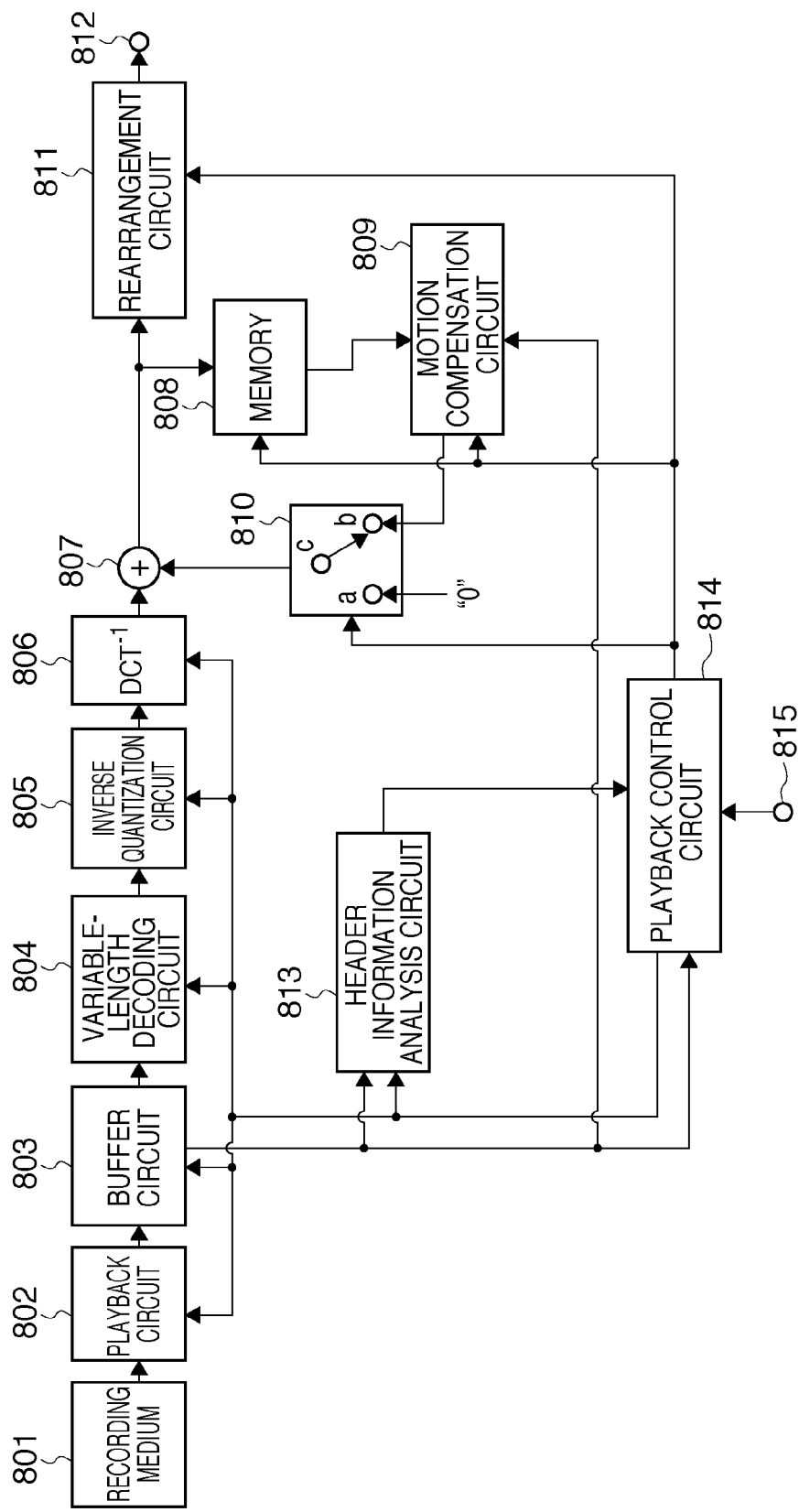
FIG. 8 is a block diagram for explaining a conventional playback apparatus.
Figure 9:
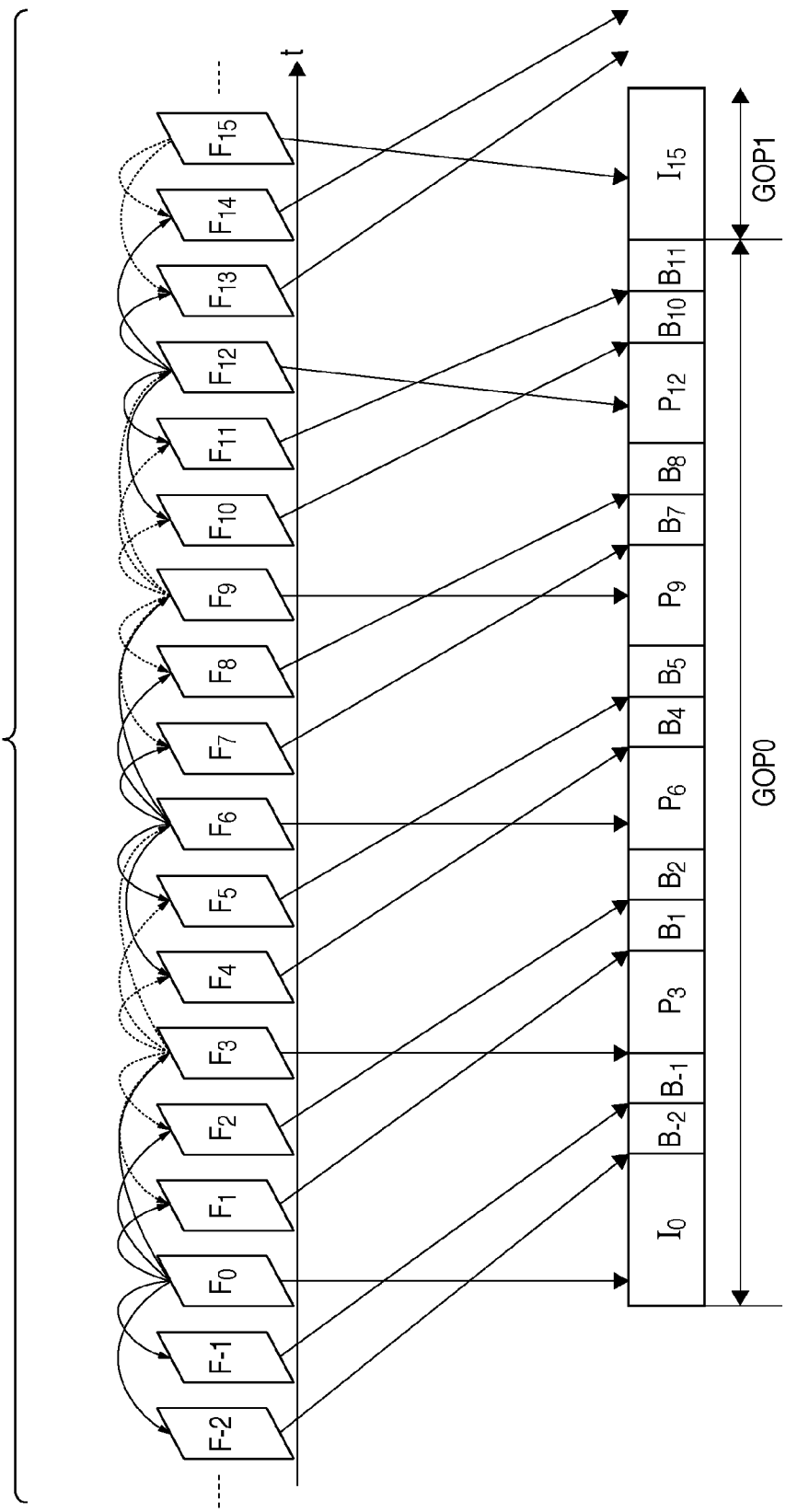
FIG. 9 is a view for explaining the order of frames to be encoded.
Figure 10:
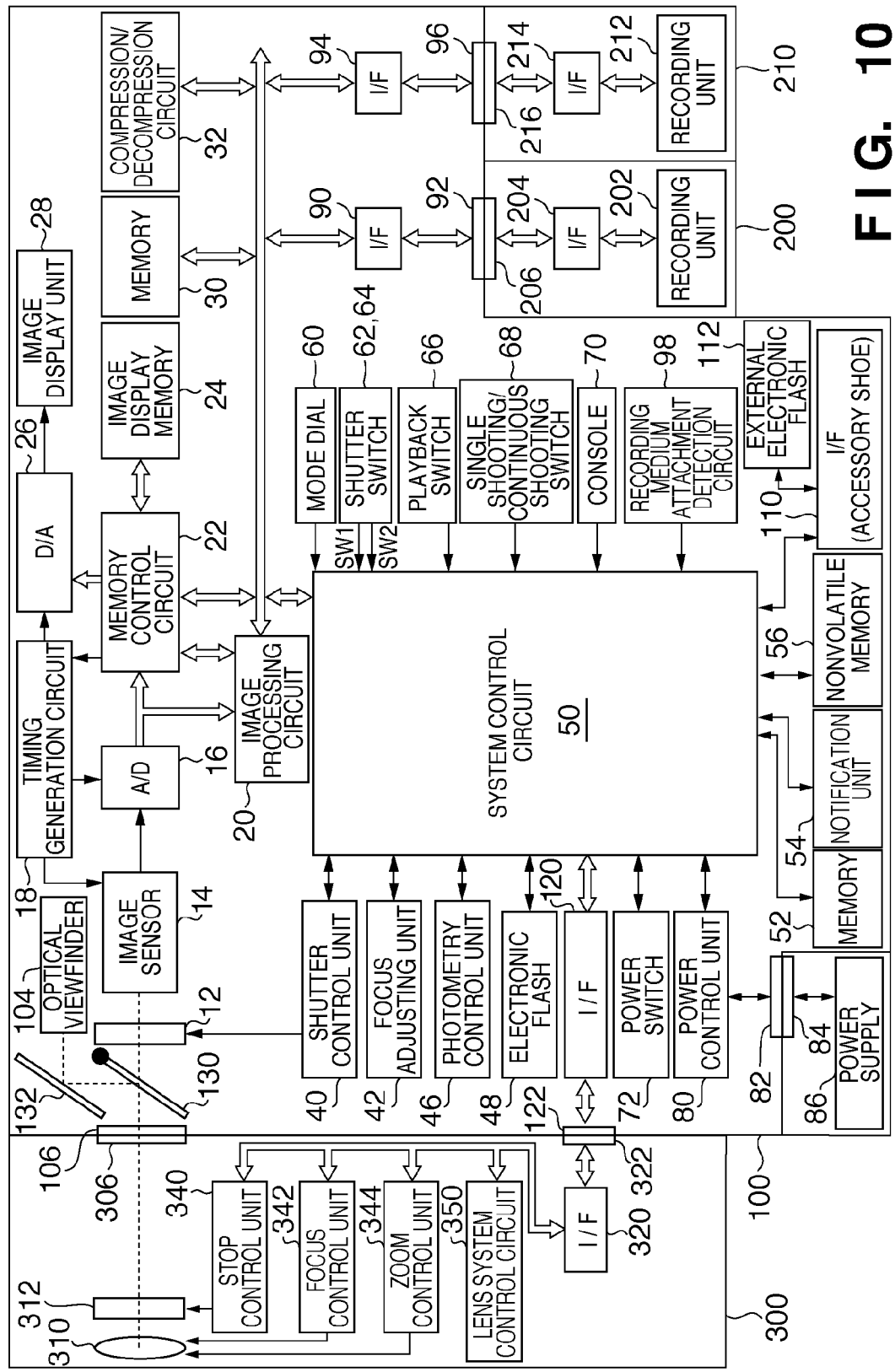
FIG. 10 is a block diagram showing the arrangement of an image capturing apparatus common to embodiments of the present invention.

As shown in FIG. 10, the image capturing apparatus according to the embodiment mainly includes a camera body 100 and an interchangeable-lens type lens unit 300.

The lens unit 300 includes an imaging lens 310 formed from a plurality of lenses, a stop 312, and a lens mount 306 which mechanically connects the lens unit 300 to the camera body 100. The lens mount 306 incorporates various functions for electrically connecting the lens unit 300 to the camera body 100. In the lens mount 306, an interface 320 connects the lens unit 300 to the camera body 100. A connector 322 electrically connects the lens unit 300 to the camera body 100.

The connector 322 also has a function of exchanging control signals, state signals, and data signals between the camera body 100 and the lens unit 300 and also receiving currents of various voltages. The connector 322 may also communicate not only by telecommunication but also by optical communication or speech communication.

A stop control unit 340 controls the stop 312 in cooperation with a shutter control unit 40 (to be described later) which controls a shutter 12 of the camera body 100 on the basis of photometry information from a photometry control unit 46. A focus control unit 342 controls focusing of the imaging lens 310. A zoom control unit 344 controls zooming of the imaging lens 310.

A lens system control circuit 350 controls the overall lens unit 300. The lens system control circuit 350 has a memory for storing constants, variables, and programs for operations. The lens system control circuit 350 also has a nonvolatile memory for holding identification information such as a number unique to the lens unit 300, management information, functional information such as the open and minimum aperture values and a focal length, and current and past set values.

The arrangement of the camera body 100 will be described next.

A lens mount 106 mechanically connects the camera body 100 to the lens unit 300. Mirrors 130 and 132 guide a light beam that has entered the imaging lens 310 to an optical viewfinder 104 by the single-lens reflex method. The mirror 130 can be either a quick return mirror or a half mirror. Reference numeral 12 denotes a shutter. An image sensor 14 photoelectrically converts an object image. A light beam which has entered the imaging lens 310 is guided via the stop 312 serving as a light quantity restriction means, the lens mounts 306 and 106, the mirror 130, and the shutter 12 by the single-lens reflex method and forms an optical image on the image sensor 14.

An A/D converter 16 converts an analog signal output from the image sensor 14 into a digital signal. A timing generation circuit 18 supplies clock signals and control signals to the image sensor 14, the A/D converter 16, and a D/A converter 26. The timing generation circuit 18 is controlled by a memory control circuit 22 and system control circuit 50.

An image processing circuit 20 executes predetermined pixel interpolation processing or color conversion processing for data from the A/D converter 16 or data from the memory control circuit 22. If necessary, the image processing circuit 20 also performs predetermined arithmetic processing using image data output from the A/D converter 16. Based on the obtained arithmetic result, the system control circuit 50 executes auto-focus (AF) processing, auto-exposure (AE) processing, and pre-electronic flash (EF) processing of TTL (Through The Lens) scheme to control the shutter control unit 40 and a focus adjusting unit 42. The image processing unit 20 also executes predetermined arithmetic processing using image data output from the A/D converter 16 and also performs automatic white balance (AWB) processing by TTL scheme based on the obtained arithmetic result.

In the example shown in FIG. 10 in the embodiment, the focus adjusting unit 42 and photometry control unit 46 are provided for exclusive use. Hence, AF processing, AE processing, and EF processing may also be performed using not the image processing circuit 20 but the focus adjusting unit 42 and photometry control unit 46. Alternatively, AF processing, AE processing, and EF processing may also be performed first by using the focus adjusting unit 42 and photometry control unit 46 and then by using the image processing circuit 20.

The memory control circuit 22 controls the A/D converter 16, the timing generation circuit 18, the image processing circuit 20, an image display memory 24, the D/A converter 26, a memory 30, and a compression/decompression circuit 32. Image data output from the A/D converter 16 is written in the image display memory 24 or memory 30 via the image processing circuit 20 and memory control circuit 22 or via only the memory control circuit 22.

Display image data written in the image display memory 24 is displayed on an image display unit 28 such as an LCD of TTL scheme via the D/A converter 26. The image display unit 28 sequentially displays captured image data, thereby implementing an electronic viewfinder (EVF) function. The image display unit 28 can arbitrarily turn on/off its display in accordance with an instruction from the system control circuit 50. When display is OFF, the power consumption of the camera body 100 can greatly be reduced.

The memory 30 is used to store sensed still images and has a memory capacity enough to store a predetermined number of still images. Hence, even in continuous shooting or panoramic shooting for continuously shooting a plurality of still images, an enormous amount of image data can be written in the memory 30 at high speed. The memory 30 is also usable as the work area of the system control circuit 50.

The compression/decompression circuit 32 compresses/decompresses image data using a known compression method. The compression/decompression circuit 32 reads out an image from the memory 30, compresses or decompresses it, and writes the processed data in the memory 30 again.

The shutter control unit 40 controls the shutter 12 in cooperation with the stop control unit 340 that controls the stop 312 on the basis of photometry information from the photometry control unit 46. The focus adjusting unit 42 executes AF (Auto Focus) processing. A light beam that has entered the imaging lens 310 of the lens unit 300 is guided via the stop 312, lens mounts 306 and 106, mirror 130, and a focus adjusting sub-mirror (not shown) by the single-lens reflex method, thereby detecting the focus state of an image formed as an optical image.

The photometry control unit 46 executes AE (Auto Exposure) processing. A light beam that has entered the imaging lens 310 in the lens unit 300 is guided via the stop 312, lens mounts 306 and 106, mirror 130, and a photometry sub-mirror (not shown) by the single-lens reflex method, thereby measuring the exposure state of an image formed as an optical image. An electronic flash 48 has an AF auxiliary light projecting function and an electronic flash control function. The photometry control unit 46 also has an EF (Electronic Flash control) processing function in cooperation with the electronic flash 48.

AF control may also be done using the measurement result of the focus adjusting unit 42 and the arithmetic result obtained by causing the image processing circuit 20 to arithmetically process image data from the A/D converter 16. Exposure control may also be done using the measurement result of the photometry control unit 46 and the arithmetic result obtained by causing the image processing circuit 20 to arithmetically process image data from the A/D converter 16.

The system control circuit 50 controls the overall camera body 100 and incorporates a known CPU. A memory 52 stores constants, variables, and programs for the operation of the system control circuit 50.

A notification unit 54 notifies the outside of operation states, messages, and the like using a text, image, and sound in accordance with a program executed by the system control circuit 50. As the notification unit 54, a display unit such as an LCD or LED for visual display and a sound generation element for generating a notification by sound are used. The notification unit 54 includes one of them or a combination of at least two of them. In particular, a display unit is arranged at one or a plurality of visible positions near an operation unit 70 of the camera body 100. Some functions of the notification unit 54 are arranged in the optical viewfinder 104.

The display contents of the image display unit 28 such as an LCD among those of the notification unit 54 include display associated with shooting modes such as single shooting/continuous shooting and self timer, display associated with recording such as a compression ratio, number of recording pixels, number of recorded images, and number of recordable images, and display associated with shooting conditions such as the shutter speed, aperture value, exposure compensation, brightness compensation, external flash light emission amount, and red eye mitigation. The image display unit 28 also displays macro shooting, buzzer setting, battery level, error message, information by a plurality of digits, and the attached/detached states of a recording medium 200 and PC 210. The image display unit 28 also displays the attached/detached state of the lens unit 300, communication I/F operation, date and time, and the connection state of an external computer.

Some of the display contents of the notification unit 54 are displayed in the optical viewfinder 104, including, for example, in-focus, ready for shooting, camera shake warning, flash charge, flash charge completion, shutter speed, aperture value, exposure compensation, and recording medium write operation.

A nonvolatile memory 56 is an electrically erasable programmable memory such as an EEPROM and stores programs (to be described later) and the like.

Reference numerals 60, 62, 64, 66, 68, and 70 denote operation means for inputting various kinds of operation instructions of the system control circuit 50. They include a single component or a combination of a plurality of switches, dials, touch panel, pointing by line-of-sight detection, and voice recognition device.

These operation means will be described here in detail.

The mode dial switch 60 can selectively set a shooting mode such as an automatic shooting mode, programmed shooting mode, shutter speed priority shooting mode, stop priority shooting mode, manual shooting mode, or focal depth priority (depth) shooting mode. The mode dial switch 60 can also selectively set a shooting mode such as a portrait shooting mode, landscape shooting mode, closeup shooting mode, sports shooting mode, nightscape shooting mode, and panoramic shooting mode. The mode dial switch 60 can also switch the mode to a moving image recording mode which is a feature of the embodiment.

The shutter switch SW1 62 is turned on by operating a shutter button (not shown) halfway (e.g., half stroke) to designate the start of an operation such as AF processing, AE processing, AWB processing, or EF processing.

The shutter switch SW2 64 is turned on by operating the shutter button (not shown) completely (e.g., full stroke) to designate the start of a series of processing operations including exposure processing, development processing, and recording processing. In the exposure processing, a signal read out from the image sensor 14 is written in the memory 30 via the A/D converter 16 and memory control circuit 22. Then, the development processing is done using calculation by the image processing circuit 20 or memory control circuit 22. In the recording processing, image data is read out from the memory 30, compressed by the compression/decompression circuit 32, and written in or transmitted to the recording medium 200 or PC 210.

The playback switch 66 designates the start of a playback operation of reading out an image sensed in a shooting mode from the memory 30, recording medium 200, or PC 210 and displaying it on the image display unit 28. The playback switch 66 can set another functional mode such as a playback mode, multiwindow playback/erase mode, or PC-connected mode.

The single shooting/continuous shooting switch 68 can set a single shooting mode in which when the user presses the shutter switch SW2 64, the camera shoots one frame and then stands by, or a continuous shooting mode in which the camera keeps shooting while the user presses the shutter switch SW2 64.

The operation unit 70 includes various buttons and a touch panel. Examples of the buttons are a live view start/stop button, menu button, setting button, multiwindow playback/page break button, flash setting button, single shooting/continuous shooting/self timer switch button, menu move plus (+) button, and menu move minus (−) button. The operation unit 70 further includes a playback image move plus (+) button, playback image move minus (−) button, shooting image quality select button, exposure compensation button, brightness compensation button, external flash light emission amount setting button, and date/time setting button. The numerical values or functions of the plus and minus buttons can more easily be selected using a rotary dial switch.

The operation unit 70 also has an image display ON/OFF switch which turns on/off the image display unit 28, and a quick review ON/OFF switch which sets a quick review function of automatically playing back sensed image data immediately after shooting. The operation unit 70 also has a compression mode switch which selects a compression ratio for JPEG compression, or a RAW mode for directly digitizing a signal from the image sensor and recording it on a recording medium. The operation unit 70 also has an AF mode setting switch capable of setting a one-shot AF mode or a servo AF mode. In the one-shot AF mode, the auto-focus operation starts when the user presses the shutter switch SW1 62. Once an in-focus state is obtained, this state keeps held. In the servo AF mode, the auto-focus operation keeps performed while the user presses the shutter switch SW1 62. The operation unit 70 also includes a setting switch capable of setting a dust information obtaining mode to sense a dust detection image and obtain dust information, as will be described later.

A power switch 72 can selectively set the power ON or power OFF mode of the camera body 100. The power switch 72 can also selectively set the power ON or power OFF mode of each of various accessories including the lens unit 300, an external electronic flash 112, the recording medium 200, and the PC 210 connected to the camera body 100.

A power supply control unit 80 includes a battery detection circuit, a DC/DC converter, and a switching circuit for switching a block to be energized. The power supply control unit 80 detects the presence/absence of attachment of a battery, the type of battery, and the battery level, controls the DC/DC converter based on the detection result and an instruction from the system control circuit 50, and supplies a necessary voltage to the units including a recording medium for a necessary period.

Reference numerals 82 and 84 denote connectors; and 86, a power supply unit formed from a primary battery such as an alkaline battery or lithium battery, a secondary battery such as an NiCd battery, NiMH battery, Li-ion battery, or Li-polymer battery, or an AC adapter.

Reference numerals 90 and 94 denote interfaces with a PC or a recording medium such as a memory card or hard disk; and 92 and 96, connectors to connect a PC or a recording medium such as a memory card or hard disk. A recording medium attachment detection circuit 98 detects whether the recording medium 200 or PC 210 is attached to the connectors 92 and/or 96.

In the embodiment, there are two systems of interfaces and connectors to connect a recording medium. The interfaces and connectors to connect a recording medium can have either one or a plurality of systems. Interfaces and connectors of different standards may also be combined.

Interfaces and connectors complying with various storage medium standards are usable. Examples are a PCMCIA (Personal Computer Memory Card International Association) card, CF (CompactFlash®) card, and SD card. When the interfaces 90 and 94 and the connectors 92 and 96 comply with the standard of the PCMCIA card or CF® card, various kinds of communication cards are connectable. Examples of the communication cards are a LAN card, modem card, USB (Universal Serial Bus) card, and IEEE (Institute of Electrical and Electronic Engineers) 1394 card. A P1284 card, SCSI (Small Computer System Interface) card, and PHS are also usable. It is possible to transfer image data and management information associated with it to another computer or a peripheral device such as a printer by connecting the various kinds of communication cards.

The optical viewfinder 104 can display an optical image formed by a light beam which enters the imaging lens 310 and is guided via the stop 312, lens mounts 306 and 106, and mirrors 130 and 132 by the single-lens reflex method. It is therefore possible to perform shooting using not the electronic viewfinder function of the image display unit 28 but only the optical viewfinder. Some of the functions of the notification unit 54 such as an in-focus state, camera shake warning, flash charge, shutter speed, aperture value, and exposure compensation are displayed in the optical viewfinder 104.

The external electronic flash 112 is attached via an accessory shoe 110.

An interface 120 connects the camera body 100 to the lens unit 300 in the lens mount 106.

The connector 122 electrically connects the camera body 100 to the lens unit 300. A lens attachment detection unit (not shown) detects whether the lens unit 300 is attached to the lens mount 106 and connector 122. The connector 122 also has a function of transmitting control signals, state signals, data signals, and the like between the camera body 100 and the lens unit 300 and also supplying currents of various voltages. The connector 122 may also communicate not only by telecommunication but also by optical communication or speech communication.

The recording medium 200 is a memory card or hard disk. The recording medium 200 includes a recording unit 202 formed from a semiconductor memory or magnetic disk, an interface 204 with the camera body 100, and a connector 206 to connect the camera body 100.

As the recording medium 200, a memory card such as a PCMCIA card or compact flash®, or a hard disk is usable. A micro DAT, a magnetooptical disk, an optical disk such as a CD-R or CD-RW, or a phase-change optical disk such as a DVD may also be used.

The PC 210 includes a recording unit 212 formed from a magnetic disk (HD), an interface 214 with the camera body 100, and a connector 216 to connect the camera body 100. The interface 214 can be a USB, interface, or the like, but is not particularly limited.

Processing of playing back an image while correcting the influence of dust on an optical member such as a low-pass filter or cover glass arranged in front of the image sensor of the image capturing apparatus having the above-described arrangement will be described next.

The embodiment will describe a method of sensing a dust detection image (still image) for obtaining dust information (foreign substance information), extracting dust data, and adding it to a subsequently sensed normal image (moving image), thereby playing back the image while correcting the dust in a PC or the like. The dust detection image is preferably obtained by sensing a surface having a luminance as uniform as possible. However, the uniformity need not be strict because it is desirable to easily sense the image in a familiar place. For example, sensing a blue sky or white wall is assumed. To explain a feature of the embodiment, an operation in the MP4 file format mainly for a moving image file will be described.

Figure 11:
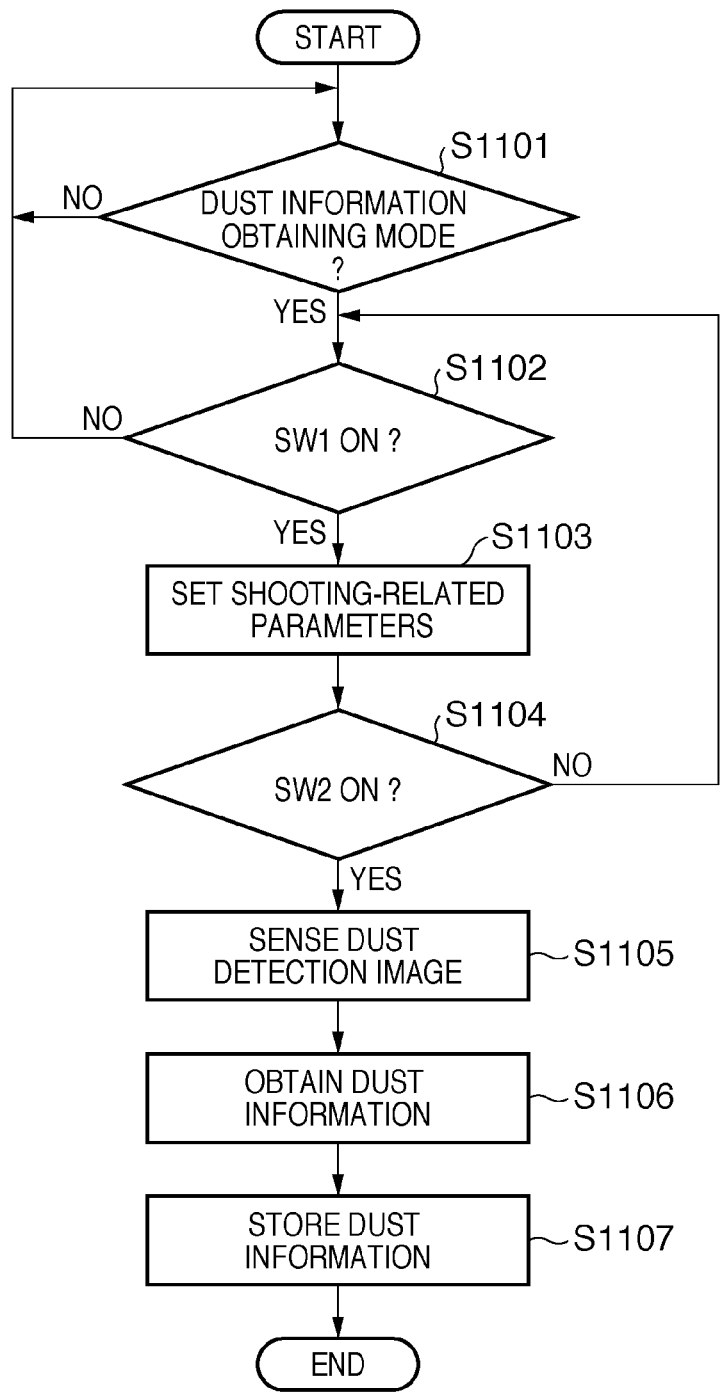
FIG. 11 is a flowchart showing processing in the image capturing apparatus when obtaining dust information.

FIG. 11 is a flowchart showing processing in the image capturing apparatus when obtaining dust information in the embodiment.

First, in step S1101, it is determined whether the operation unit 70 selects a dust information obtaining mode. The determination in step S1101 is repeated until the dust information obtaining mode is selected. When the dust information obtaining mode is selected, the process advances to step S1102 to determine whether the user has turned on the shutter switch SW1 62. If the shutter switch SW1 62 is OFF, the process returns to step S1101 to repeat the above-described processing.

Figures 12, 13:
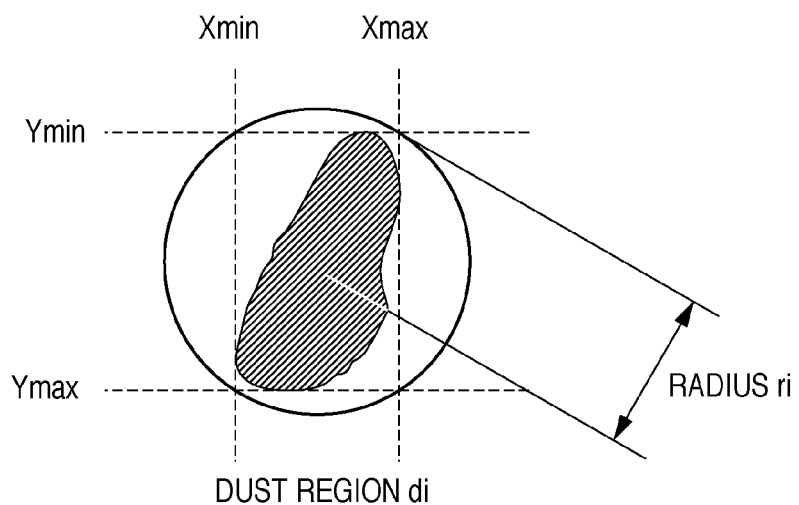
FIG. 12 is a table showing a setting example of shooting-related parameters when obtaining dust information.
FIG. 13 is a view showing an outline of dust region size calculation executed in step S1106 of FIG. 11.

If the user has turned on the shutter switch SW1 62, the aperture value, ISO value, shutter speed, and other shooting-related parameters are set (step S1103). FIG. 12 shows the parameters set here. The aperture value is set to, for example, F22 in a stopped-down-aperture state. Shooting may also be done using the minimum aperture within a range settable in the lens unit 300 connected to the lens mount 106. The aperture is stopped down because dust normally adheres not to the surface of the image sensor 14 but to the surface of a protective glass protecting the image sensor 14 or the surface of an optical filter placed not on the image sensor side but on the object side, and its imaging state changes depending on the aperture value of the lens unit 300. If the aperture is close to the full aperture, the dust image blurs, and no appropriate dust detection image can be obtained. For this reason, shooting is preferably done using the minimum aperture.

Referring back to the flowchart in FIG. 11, at this time, the user points the image capturing apparatus to a uniform luminance surface such as a wall as white as possible and operates the shutter switch SW2 64.

In step S1104, it is determined whether the user has turned on the shutter switch SW2 64. If the shutter switch SW2 64 is OFF, the process returns to step S1102 to determine whether the shutter switch SW1 62 is ON or OFF. If the user has turned on the shutter switch SW2 64, the process advances to step S1105. In step S1105, the dust detection image (uniform luminance surface) is sensed, and the image data is stored in the memory 30. In step S1106, dust information is obtained from the image data stored in the memory 30.

The obtainment of dust information will be described. More specifically, the position (coordinates) and size of each dust region are obtained from the sensed dust detection image. First, the region of the sensed dust detection image is divided into a plurality of blocks. A maximum luminance Lmax and average luminance Lave in each block are calculated. A threshold value T1 in each block is calculated by $$T1 = Lave \times 0.6 + Lmax \times 0.4$$

A pixel less than the threshold value T1 is determined as a dust pixel. Each isolated region formed from dust pixels is defined as a dust region di (i=0, 1, . . . , n).

FIG. 13 is a view showing an outline of dust region size calculation. As shown in FIG. 13, a maximum value Xmax and minimum value Xmin of the horizontal coordinates and a maximum value Ymax and a minimum value Ymin of the vertical coordinates of pixels included in a dust region are obtained for each dust region. A radius ri representing the size of the dust region di is calculated by $$ri = [\sqrt{\{(Xmax-Xmin)^2 + (Ymax-Ymin)^2\}}]/2$$

Central coordinates (Xdi,Ydi) are obtained approximately by $$Xdi = (Xmax+Xmin)/2$$

$$Ydi = (Ymax+Ymin)/2$$

The obtained position (coordinates) and radius are recorded as a dust information profile.

The dust information profile has a structure as shown in FIG. 14. As shown in FIG. 14, the dust information profile stores the lens information and the information of the position and size of dust upon sensing a dust detection image. More specifically, the actual aperture value (F-number) and the lens pupil position upon sensing a detection image are stored as the lens information upon sensing the detection image. Next, the number of detected dust regions (integer value) is stored in the storage area. Next to this value, the specific parameters of each dust region are stored repeatedly as many as the dust regions. The parameters of a dust region include a set of three numerical values: the radius of dust (e.g., 2 bytes), the x-coordinate of the center of an effective image area (e.g., 2 bytes), and the y-coordinate of the center (e.g., 2 bytes).

The obtained dust information (dust information profile) is stored in the nonvolatile memory 56 in step S1107, and the processing to obtain dust information ends. The purpose of storing dust information in the nonvolatile memory 56 is to keep adding it to image data (moving image data) obtained by normal shooting executed until dust information is obtained next after the dust information is obtained. When the user is requested to obtain dust information every time the camera is turned on, no dust information need be stored in the nonvolatile memory.

When the image capturing apparatus according to the embodiment records a moving image, a moving image file of the above-described MP4 file format is used. Hence, the dust information profile temporarily stored in the nonvolatile memory 56 is stored in an mvhd box formed from header information in the moov box of moving image data or an mvhd box in the moof box. The dust information can be added to moving image data captured by the image capturing apparatus.

Figure 15:
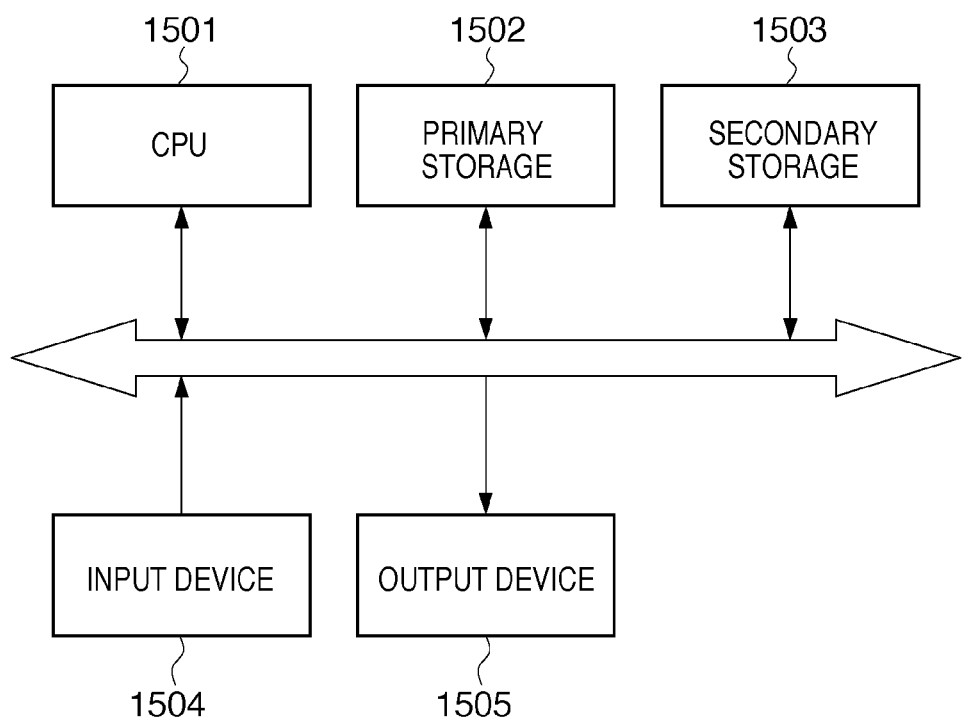
FIG. 15 is a block diagram showing the schematic system configuration of an image processing apparatus.

The sequence of dust correction playback processing will be explained. In the following description, dust correction playback processing is executed not within the digital camera body but in a separately prepared image processing apparatus. FIG. 15 is a block diagram showing the schematic system configuration of the image processing apparatus.

A CPU 1501 controls the overall system, and, for example, executes a program stored in a primary storage 1502. The primary storage 1502 is mainly a memory, and stores a program or the like read out from a secondary storage 1503. The secondary storage 1503 is, for example, a hard disk. In general, the capacity of the primary storage is smaller than that of the secondary storage. Programs, data, and the like which cannot be completely stored in the primary storage are stored in the secondary storage. Data and the like which need to be stored for a long time are also stored in the secondary storage.

In the embodiment, a program is stored in the secondary storage 1503, and when executing the program, load to the primary storage 1502 and executed by the CPU 1501. An input device 1504 includes, for example, a mouse and keyboard used to control the system, and a card reader, scanner, and film scanner necessary to input image data. An output device 1505 includes, for example, a monitor and printer. Although the apparatus can take various arrangements, this is not a gist of the present invention and a description thereof will be omitted.

The image processing apparatus incorporates an operating system capable of parallel-executing a plurality of programs, and the user can operate a program running on the apparatus using a GUI (Graphical User Interface).

Figure 16:
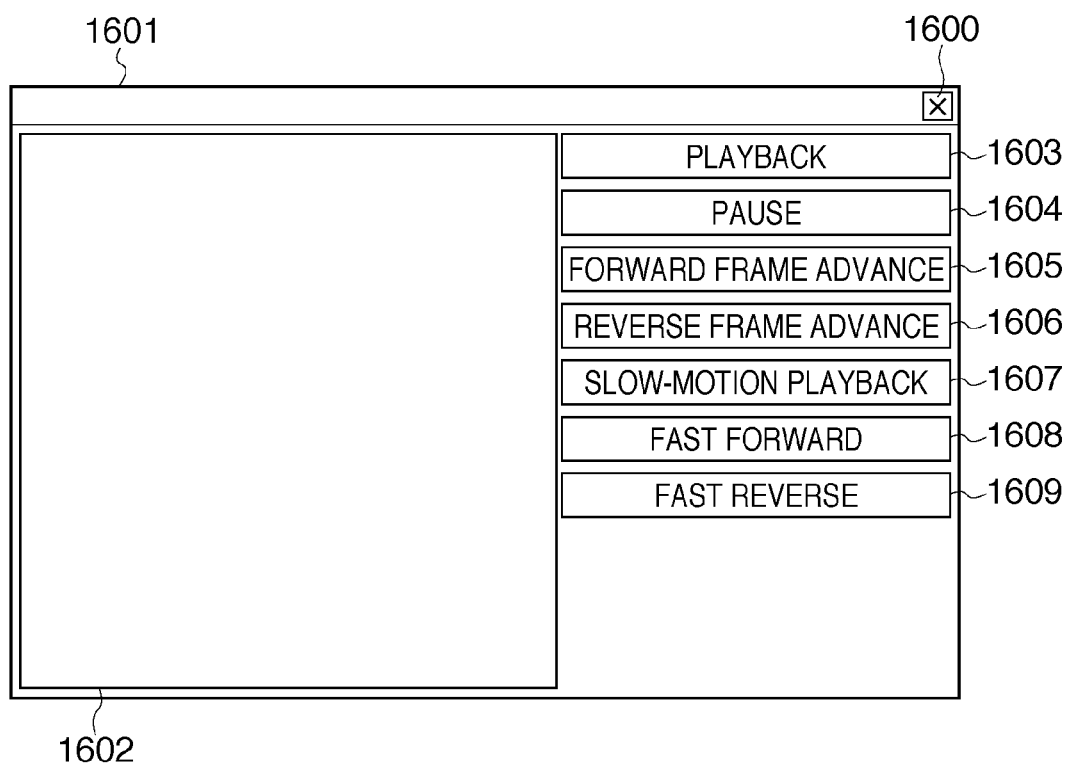
FIG. 16 is a view showing an example of a GUI in the image processing apparatus.

FIG. 16 is a view showing the GUI of an image editing program in the image processing apparatus.

The window includes a close button 1600 and title bar 1601. When the user presses the close button, the program ends. An image to undergo correction playback processing is designated by dragging and dropping a file to an image display area 1602. When the image to undergo correction playback processing is determined, the file name is displayed on the title bar 1601, and the target image is displayed to be fitted in the image display area 1602. The fit display can be handled as still image playback during moving image playback, so display may also be done by the Fit display in playback status determination dust correction processing (to be described later).

When the user presses a playback button 1603, playback processing is executed to display a processed image in the image display area 1602. When the user presses a pause button 1604, a moving image during playback pauses. Every time the user presses a forward frame advance button 1605 or reverse frame advance button 1606 in this state, the image is advanced forward or backward by one frame.

When the user presses a slow-motion playback button 1607, slow-motion playback processing is executed to display a processed image in the image display area 1602. Since slow-motion playback is a well-known technique, the playback method will not be described in detail. In slow-motion playback, a moving image is played back slower than normal playback by prolonging the display time of one frame.

When the user presses a fast-forward playback button 1608, fast-forward playback processing is executed to display a processed image in the image display area 1602. Since fast-forward playback is a well-known technique, the playback method will not be described in detail. In fast-forward playback, a moving image is played back more quickly than normal playback by decimating frames or shortening the display time.

When the user presses a fast-reverse playback button 1609, fast-reverse playback processing is executed to display a processed image in the image display area 1602. Since fast-reverse playback is a well-known technique, the playback method will not be described in detail. In fast-reverse playback, the flow of frames is reversed while decimating frames or shortening the display time, thereby playing back a moving image more quickly than normal playback while going back in time.

Figure 17:
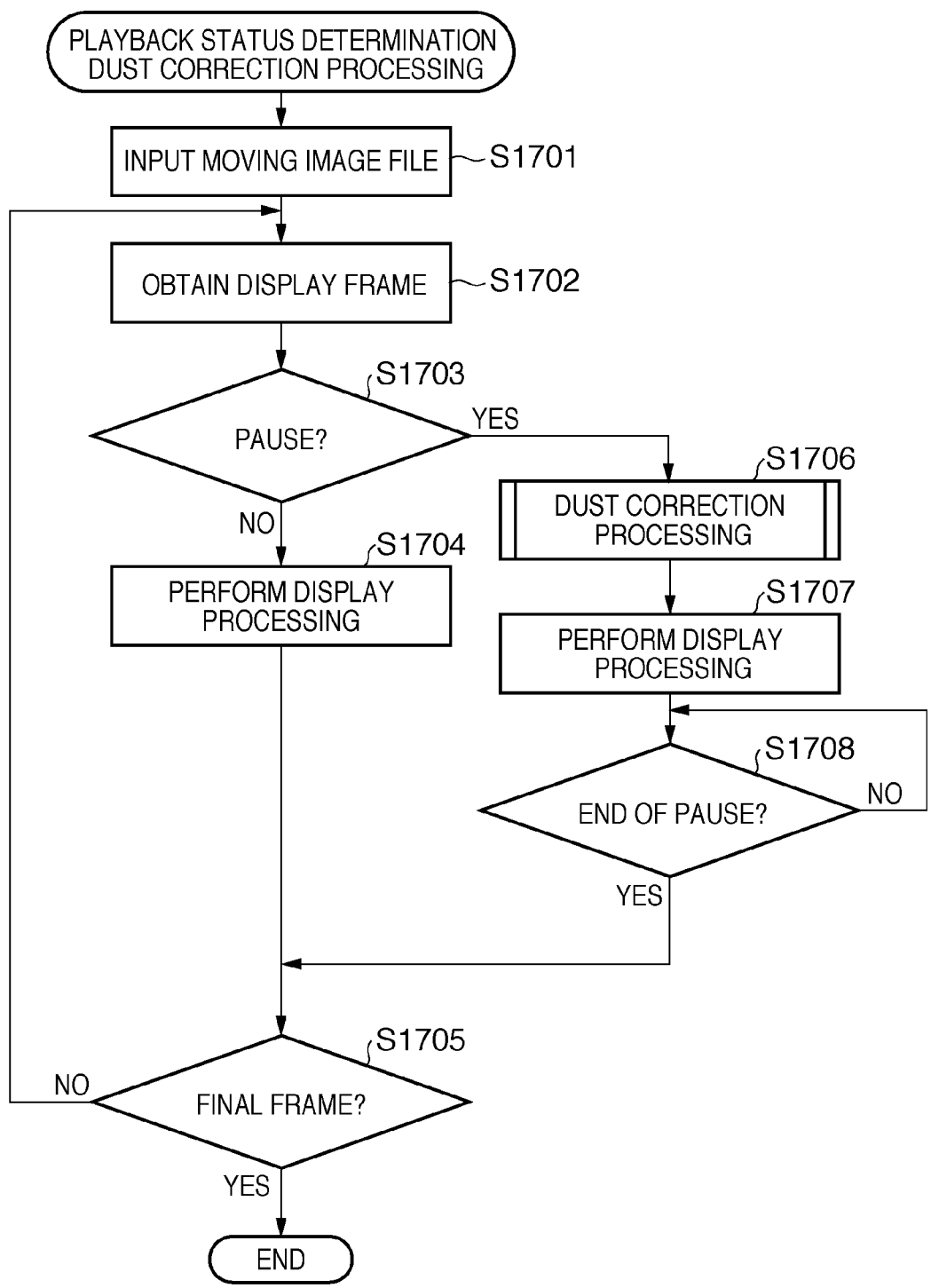
FIG. 17 is a flowchart for explaining playback status determination dust correction processing in the first embodiment.

FIG. 17 shows the sequence of playback status determination dust correction processing in the image processing apparatus. The sequence of playback status determination dust correction processing upon pause will be explained with reference to FIG. 17.

A moving image file including dust position correction data is input to the image processing apparatus from the digital camera or the recording medium 200 removed from the digital camera, and stored the primary storage 1502 or secondary storage 1503 (step S1701). In step S1702, display frame obtaining processing (processing to decode an MP4 file and play back a frame) is executed in step S1702. This processing is a well-known technique disclosed in Description of the Related Art, and a detailed description thereof will be omitted.

In step S1703, it is determined whether the user has pressed the pause button 1604. If it is determined in step S1703 that the user has not pressed the pause button 1604, display processing is executed (step S1704). In the display processing, a frame obtained in step S1702 is displayed in the image display area 1602. Dust correction processing may also be executed before the display processing as far as the resource such as a memory and the processing time for dust correction permit. However, to more simply explain a feature of the embodiment, only display processing is done without performing dust correction processing.

In step S1705, it is determined whether the current frame is a final one. If it is determined that the current frame is a final one, the playback status determination dust correction processing ends. If it is determined that the current frame is not a final one, a frame to be displayed next is obtained in step S1702. Step S1702 and subsequent steps are repeated until all frames are processed.

If it is determined in step S1703 that the user has pressed the pause button 1604, moving image playback is interrupted, and a frame played back upon pressing the pause button 1604 is displayed as a still image. Before displaying the frame, the frame undergoes dust correction processing in step S1706. The dust correction processing will be explained with reference to FIG. 18.

In step S1707, display processing is done. Although the display processing in step S1707 is the same as that in step S1704, a frame in which dust has been corrected by the dust correction processing in step S1706 is displayed as a still image during the pause. If it is determined in step S1708 that an instruction to end the pause has been issued, the process shifts to step S1705, and step S1702 and subsequent steps are repeated until all frames are processed.

According to this sequence, the playback status determination dust correction processing is executed.

FIG. 18 shows the sequence of the dust correction processing in step S1706 of FIG. 17.

A frame to undergo dust correction processing is selected from video samples (frames) of a moving image displayed in the image display area 1602 (step S1801). The frame to undergo dust correction processing is a display frame obtained in step S1702 of FIG. 17. Dust position correction data is extracted from moov or moof including the selected frame. Dust correction data (dust information profile) is extracted from the extracted dust position correction data, obtaining a coordinate sequence $D_i$ (i=1, 2, ..., n), a radius sequence $R_i$ (i=1, 2, ..., n), an aperture value f1, and a lens pupil position L1. Further, an aperture value f2 and lens pupil position L2 upon shooting are obtained (step S1802). $R_i$ represents the size of dust at the coordinates $D_i$ calculated in step S1106 of FIG. 11.

In step S1803, $D_i$ is converted by the following equation. Converted coordinates $D_i'$ and a converted radius $R_i'$ are defined by $$D_i'(x,y)=(L2\times(L1-H)\times d/((L2-H)\times L1))\times D_i(x,y)$$

$$R_i'=(R_i \times f1./f2+3) \quad (1)$$

where d is the distance from the image center to the coordinates $D_i$, and H is the distance from the surface of the image sensor 14 to dust.

The unit is a pixel, and "+3" for $R_i'$ means a margin.

In step S1804, dust in a region defined by the coordinates $D_i'$ and radius $R_i'$ is detected, and if necessary, interpolation processing is applied. Details of the interpolation processing will be described later.

In step S1805, it is determined whether dust removal processing has been applied to all coordinates. If the dust removal processing has ended at all coordinates, the process ends. If the dust removal processing has not ended at all coordinates, the process returns to step S1804.

The sequence of the dust correction processing has been described.

Figure 19:
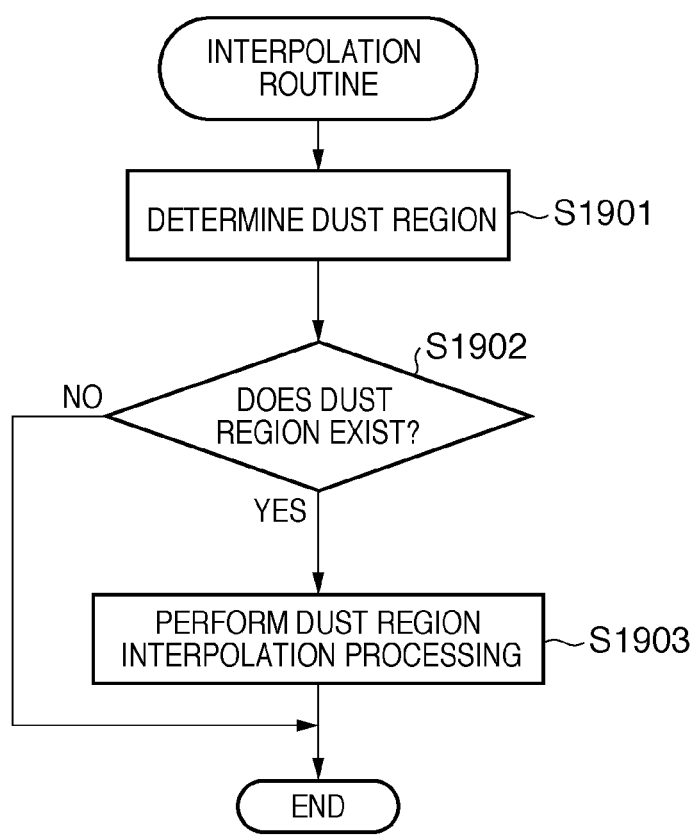
FIG. 19 is a flowchart for explaining details of an interpolation routine.

Details of the dust region interpolation processing will be explained. FIG. 19 is a flowchart showing the sequence of an interpolation routine. In step S1901, a dust region is determined. The dust region is defined as a region which satisfies all the following conditions:

(1) a region which is darker than a threshold value T2 obtained using an average luminance Yave and maximum luminance Ymax of pixels falling in a region defined by the center coordinates $D_i'$ and radius $R_i'$ ($R_i'$ and $D_i'$ calculated by equation (1)) calculated in step S1803 of FIG. 18:

$$T2=Yave\times0.6+Ymax\times0.4$$

(2) a region which does not contact a circle having the radius $R_i'$ from the center coordinates $D_i'$.

(3) a region whose radius value calculated by the same method as step S1106 in FIG. 11 is equal to or larger than x1 pixels and smaller than x2 pixels with respect to an isolated region of low-luminance pixels selected in (1).

(4) a region containing the center coordinates $D_i$ of the circle.

In the embodiment, x1 represents three pixels, and x2 represents 30 pixels. With this setting, only a small isolated region can be handled as a dust region. When no lens pupil position can be accurately obtained, condition (4) may also be eased. For example, when the region of interest contains the coordinates of a range of ±3 pixels from the coordinates $D_i$ in both the X and Y directions, it is determined as a dust region.

If such a region exists in step S1902, the process advances to step S1903 to perform dust region interpolation. If no such region exists, the process ends. The dust region interpolation processing executed in step S1903 adopts a known defective region interpolation method. An example of the known defective region interpolation method is pattern replacement disclosed in Japanese Patent Laid-Open No. 2001-223894. In Japanese Patent Laid-Open No. 2001-223894, a defective region is specified using infrared light. In the embodiment, a dust region detected in step S1901 is handled as a defective region, and interpolated by normal neighboring pixels by pattern replacement. For a pixel which cannot be interpolated by pattern replacement, p normal pixels are selected sequentially from one closest to the pixel to be interpolated in image data having undergone pattern correction, and the target pixel is interpolated using the average color of them.

The sequence of the dust region interpolation processing has been described.

As described above, the first embodiment can increase the operating speed and reduce the amount of resource such as memory used when playing back a moving image file such as an MP4 file while performing dust correction processing using dust information. At the same time, the first embodiment can provide the user with a high-quality image in which the shadow of dust or the like is corrected in still image display upon pause in which the user views an image carefully for a long time during moving image playback.

Second Embodiment

The arrangement of an image processing apparatus in the second embodiment of the present invention is the same as that shown in FIG. 15, but its operation is different. The operation in the second embodiment will be explained.

Figure 20:
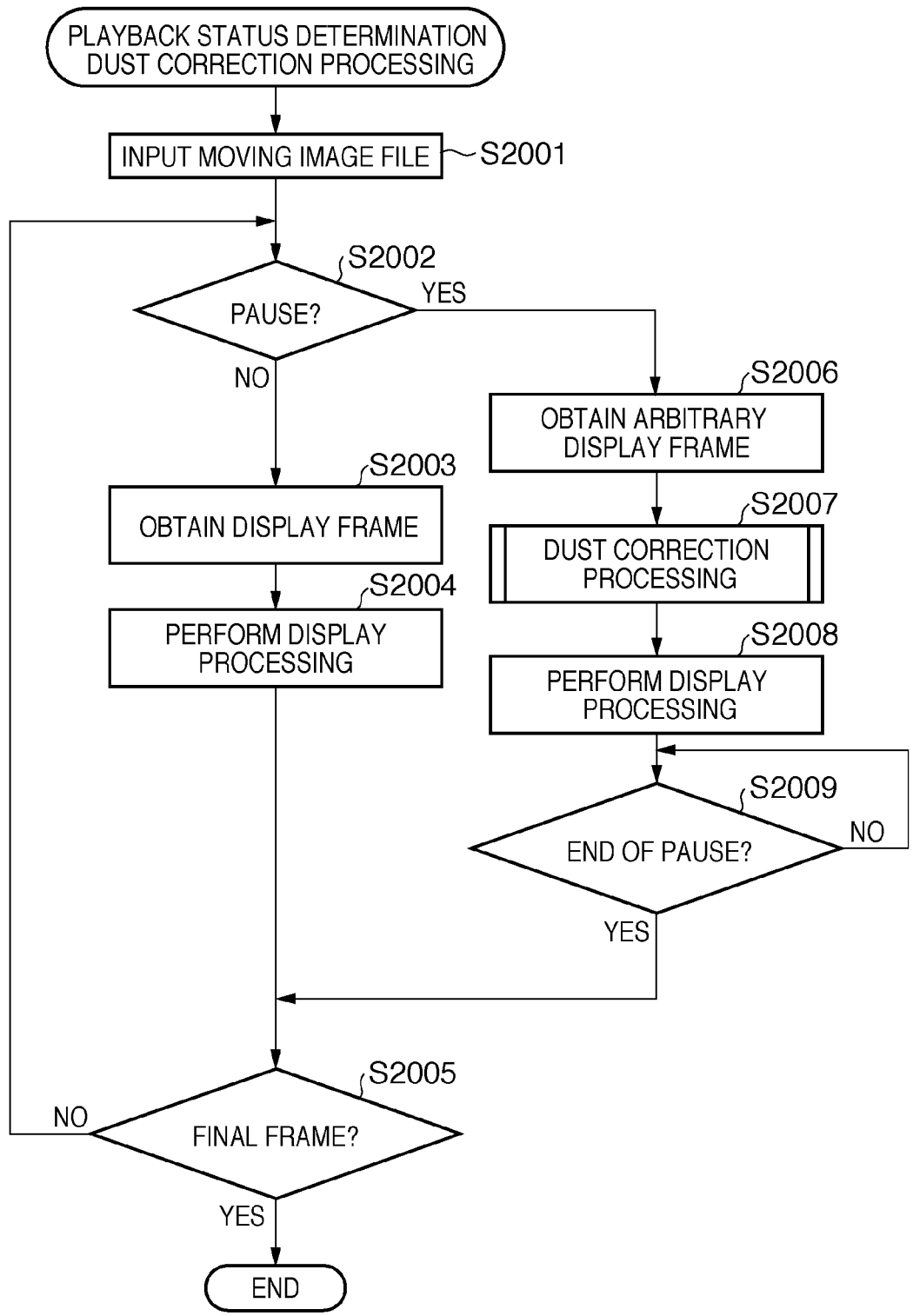
FIG. 20 is a flowchart for explaining playback status determination dust correction processing in the second embodiment.

FIG. 20 is a flowchart showing playback status determination dust correction processing in the second embodiment. This processing is different from that in the first embodiment.

Similar to the first embodiment, the sequence of playback status determination dust correction processing upon pause will be explained with reference to FIG. 20.

A moving image file including dust position correction data is input to an image processing apparatus from a digital camera or a recording medium 200 removed from the digital camera, and stored in a primary storage 1502 or secondary storage 1503 (step S2001).

In step S2002, it is determined whether the user has pressed a pause button 1604. If it is determined in step S2002 that the user has not pressed the pause button 1604, a display frame is obtained in step S2003 to perform display processing (step S2004). In step S2005, it is determined whether the current frame is a final one, similar to the first embodiment.

If it is determined that the current frame is a final one, the playback status determination dust correction processing ends. If it is determined that the current frame is not a final one, a frame to be displayed next is obtained in step S2003. Step S2002 and subsequent steps are repeated until all frames are processed.

If it is determined in step S2002 that the user has pressed the pause button 1604, moving image playback is interrupted, and an arbitrary display frame is obtained in step S2006. In the embodiment, if a frame has been obtained in step S2003, it may also be used again as an arbitrary display frame obtained in step S2006, or a frame immediately preceding one obtained in step S2003 may also be used. Even if no frame has been obtained in step S2003, an arbitrary frame suffices to be obtained, so the first frame or an intermediate frame may also be used.

Before displaying the obtained arbitrary display frame, dust correction processing is done in step S2007. The dust correction processing has been described with reference to FIG. 18.

In step S2008, display processing is performed. Although the display processing in step S2008 is the same as that in step S2004, a frame in which dust has been corrected by the dust correction processing in step S2007 is displayed as a still image during the pause. If it is determined in step S2009 that an instruction to end the pause has been issued, the process shifts to step S2005, and step S2002 and subsequent steps are repeated until all frames are processed.

According to this sequence, the playback status determination dust correction processing is executed.

Reusing in step S2006 a frame obtained in step S2003 is effective for reducing the memory, and also effective for increasing the operating speed because the readout time and transfer time are shortened.

As described above, the second embodiment can increase the operating speed and reduce the amount of resource such as memory used when playing back a moving image file such as an MP4 file while performing dust correction processing using dust information. In addition, the second embodiment can provide the user with a high-quality image in which the shadow of dust or the like is corrected when an arbitrary still image is displayed among still images and the user views the image carefully for a long time in a pause during moving image playback.

Third Embodiment

The arrangement of an image processing apparatus in the third embodiment of the present invention is the same as that shown in FIG. 15, but its operation is different. The operation in the third embodiment will be explained.

Figure 21:
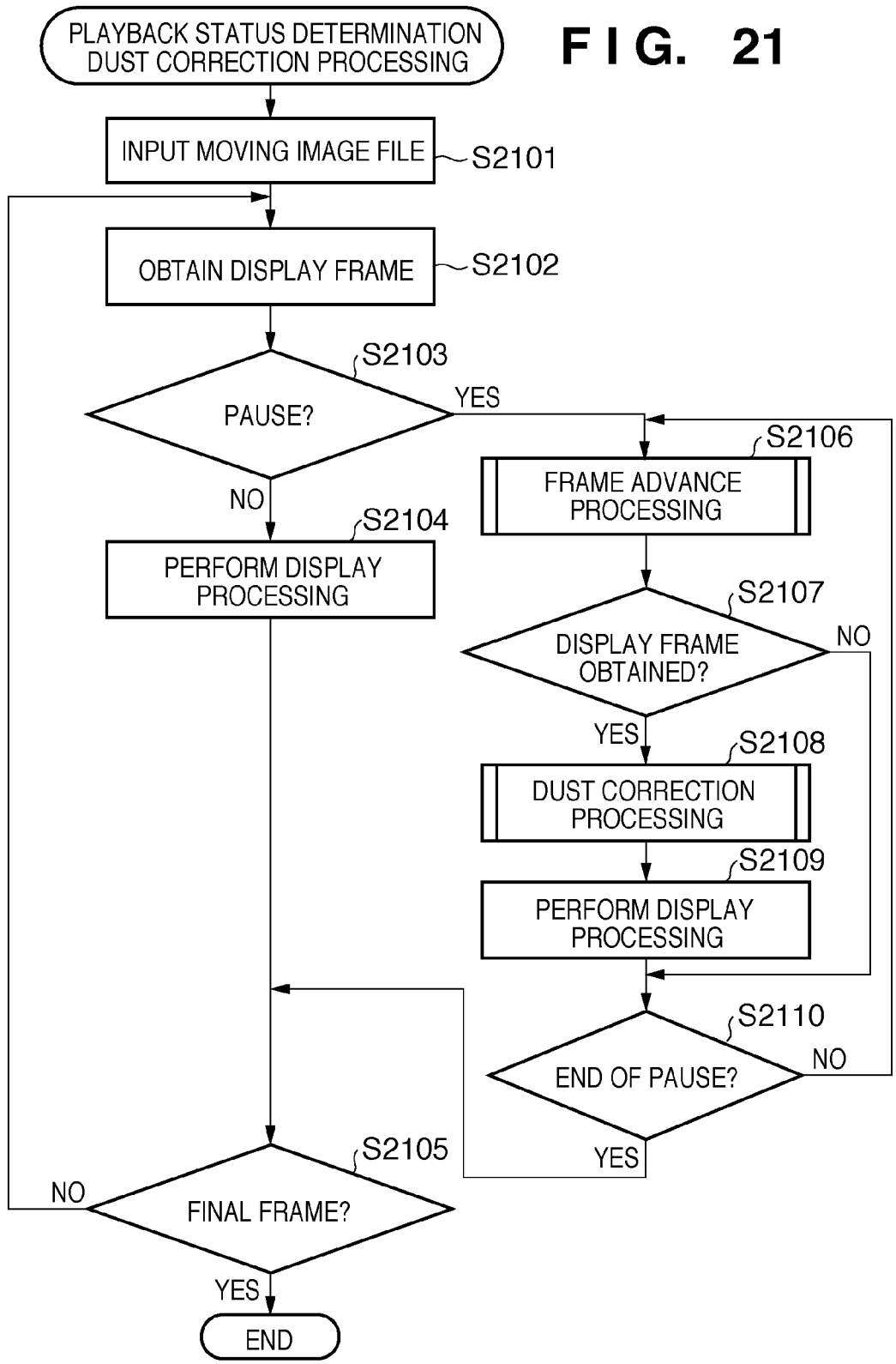
FIG. 21 is a flowchart for explaining playback status determination dust correction processing in the third embodiment.

Playback status determination dust correction processing in forward or reverse frame advance in the third embodiment will be explained with reference to FIG. 21.

In forward or reverse frame advance in the third embodiment, every time the user presses a forward frame advance button 1605 or reverse frame advance button 1606 during a pause, one frame is advanced forward or reversely.

The sequence up to step S2103 is the same as those in the first and second embodiments.

If it is determined in step S2103 that the user has not pressed a pause button 1604, display processing is done (step S2104), and it is determined in step S2105 whether the current frame is a final one, similar to the first embodiment. Also similar to the first embodiment, if it is determined that the current frame is a final one, the playback status determination dust correction processing ends. If it is determined that the current frame is not a final one, a frame to be displayed next is obtained in step S2102. Step S2102 and subsequent steps are repeated until all frames are processed.

If it is determined in step S2103 that the user has pressed the pause button 1604, frame advance processing is performed in step S2106. The frame advance processing will be described with reference to FIG. 22.

It is determined in step S2107 whether a display frame has been obtained in step S2102, or step S2202 or S2204 (to be described later). If it is determined that a display frame has been obtained, dust correction processing is executed in steps S2108 and S2109 to display the display frame, similar to steps S1706 and S1707 in the first embodiment. If it is determined that no display frame has been obtained, it is determined in step S2110 whether an instruction to end the pause has been issued. If an instruction to end the pause has not been issued, the process returns to step S2106 to repeat the frame advance processing.

If it is determined in step S2110 that an instruction to end the pause has been issued, the process shifts to step S2105 to determine whether the current frame is a final one. If the current frame is not a final one, a frame to be displayed next is obtained in step S2102. Step S2102 and subsequent steps are repeated until all frames are processed.

Figure 22:
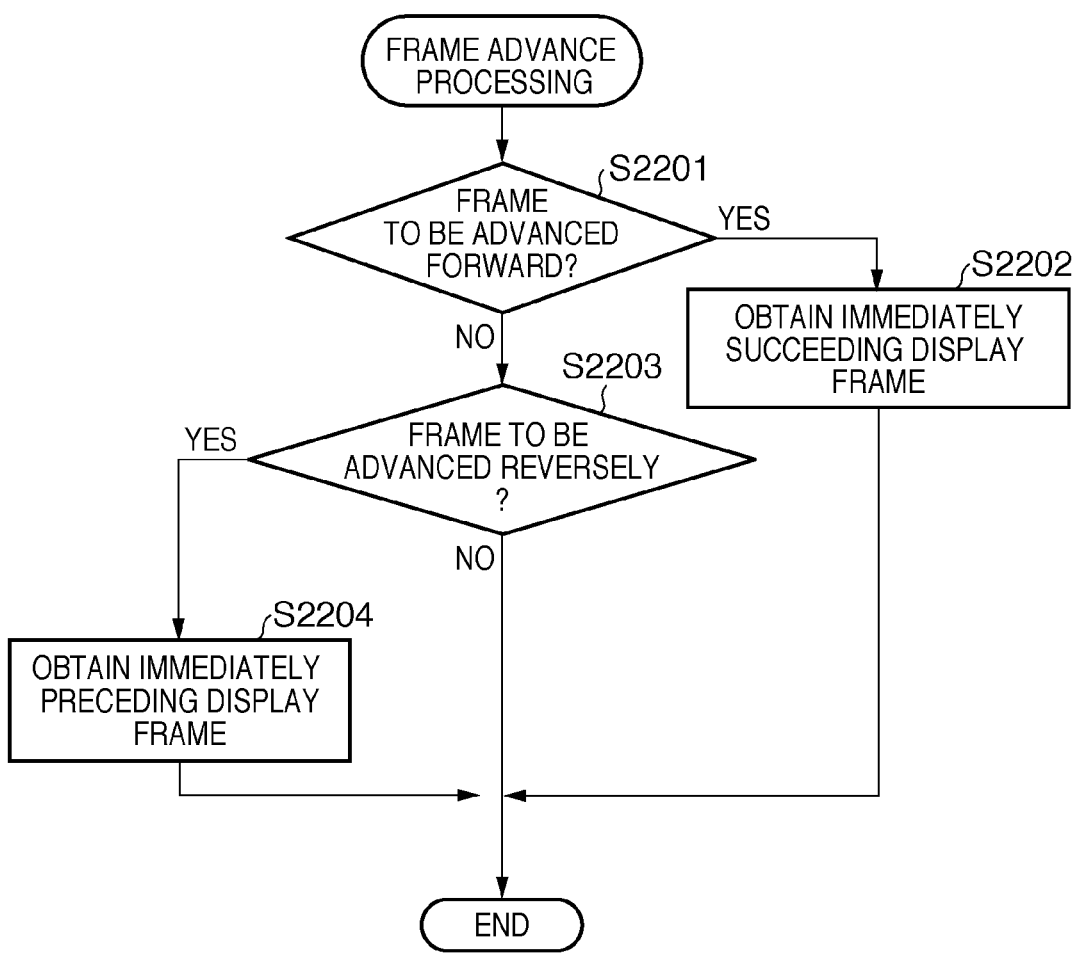
FIG. 22 is a flowchart for explaining frame advance processing in the third embodiment.

The sequence of the frame advance processing will be explained with reference to FIG. 22.

In step S2201, it is determined whether the user has pressed the forward frame advance button 1605. If it is determined that the user has pressed the forward frame advance button 1605, the process shifts to step S2202 to obtain a frame immediately preceding one obtained in step S2102 of FIG. 21. Then, the process ends.

If it is determined in step S2201 that the user has not pressed the forward frame advance button 1605, it is determined in step S2203 whether he has pressed the reverse frame advance button 1606. If it is determined that the user has pressed the reverse frame advance button 1606, the process shifts to step S2204 to obtain a frame immediately succeeding one obtained in step S2102 of FIG. 21. Then, the process ends.

If it is determined in step S2203 that the user has not pressed the reverse frame advance button 1606, the process ends without doing anything.

According to this sequence, the playback status determination dust correction processing upon forward frame advance and reverse frame advance is executed.

As described above, the third embodiment can increase the operating speed and reduce the amount of a resource such as memory used when playing back a moving image file such as an MP4 file while performing dust correction processing using dust information. In addition, the third embodiment can provide the user with a high-quality image in which the shadow of dust or the like is corrected in still image display upon forward or reverse frame advance in which the user views an image carefully for a long time during moving image playback.

Fourth Embodiment

The arrangement of an image processing apparatus in the fourth embodiment of the present invention is the same as that shown in FIG. 15, but its operation is different. The operation in the fourth embodiment will be explained.

Figure 23:
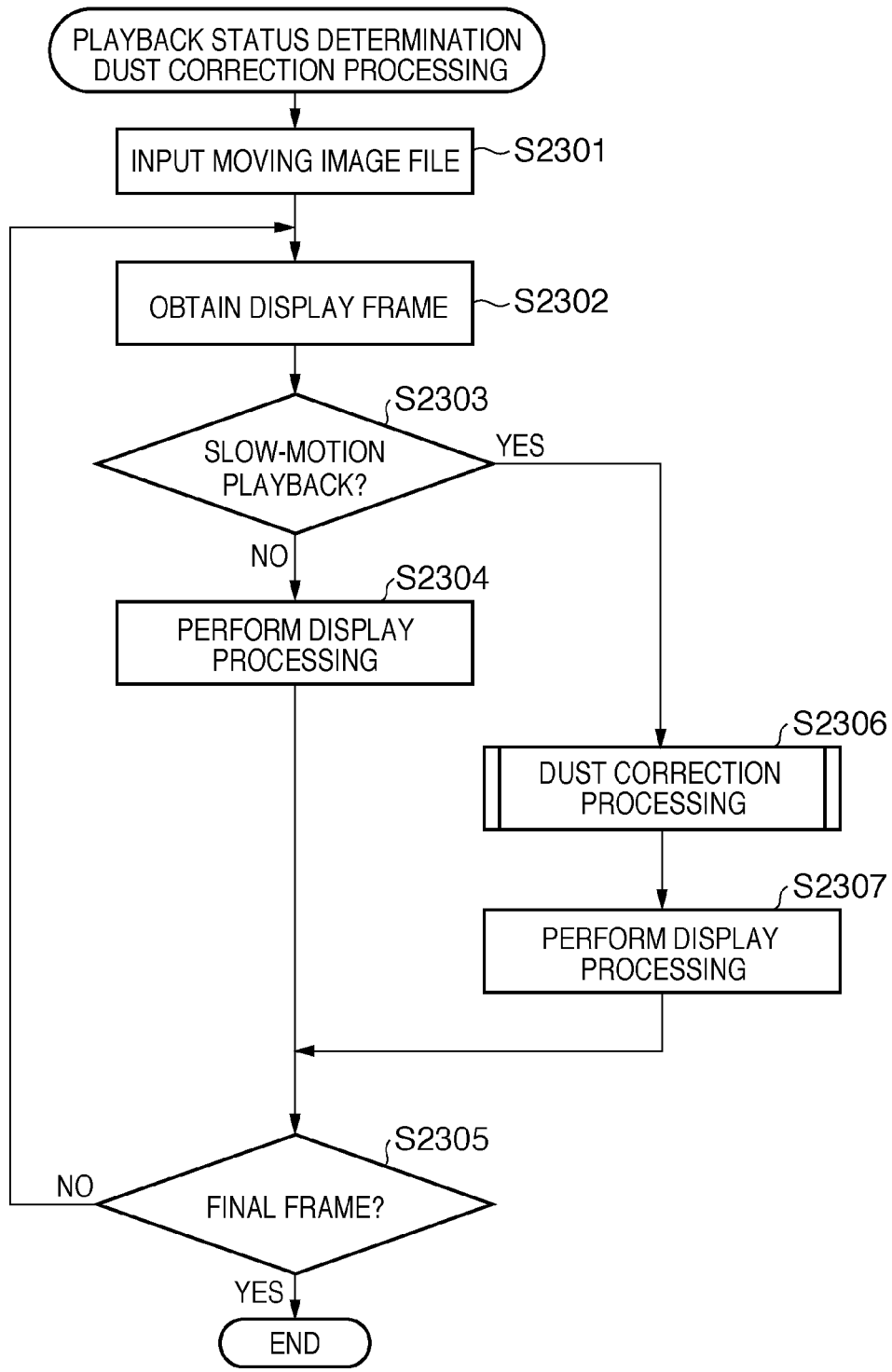
FIG. 23 is a flowchart for explaining playback status determination dust correction processing in the fourth embodiment.

FIG. 23 shows the sequence of playback status determination dust correction processing in the fourth embodiment. The sequence of playback status determination dust correction processing in slow-motion playback will be explained with reference to FIG. 23.

The sequence up to step S2302 in FIG. 23 is the same as that up to step S1702 in FIG. 17.

If it is determined in step S2303 that the user has not pressed a slow-motion playback button 1607, display processing is done (step S2304), and it is determined in step S2305 whether the current frame is a final one, similar to the first embodiment. Also similar to the first embodiment, if it is determined that the current frame is a final one, the playback status determination dust correction processing ends. If it is determined that the current frame is not a final one, a frame to be displayed next is obtained in step S2302. Step S2302 and subsequent steps are repeated until all frames are processed.

If it is determined in step S2303 that the user has pressed the slow-motion playback button 1607, dust correction processing is done in step S2306 in order to prevent dust from standing out because the user views a moving image carefully for a long time in slow-motion playback.

Although display processing in step S2307 is the same as that in step S2304, a frame in which dust has been corrected by the dust correction processing in step S2306 is displayed as a slow-motion playback image. Then, the process shifts to step S2305, and step S2302 and subsequent steps are repeated until all frames are processed.

According to this sequence, the playback status determination dust correction processing is executed.

As described above, the fourth embodiment can increase the operating speed and reduce the amount of a resource such as memory used when playing back a moving image file such as an MP4 file while performing dust correction processing using dust information. At the same time, the fourth embodiment can provide the user with a high-quality image in which the shadow of dust or the like is corrected in image display by slow-motion playback in which the user views an image carefully for a long time during moving image playback.

Fifth Embodiment

The arrangement of an image processing apparatus in the fifth embodiment of the present invention is the same as that shown in FIG. 15, but its operation is different. The operation in the fifth embodiment will be explained.

Figure 24:
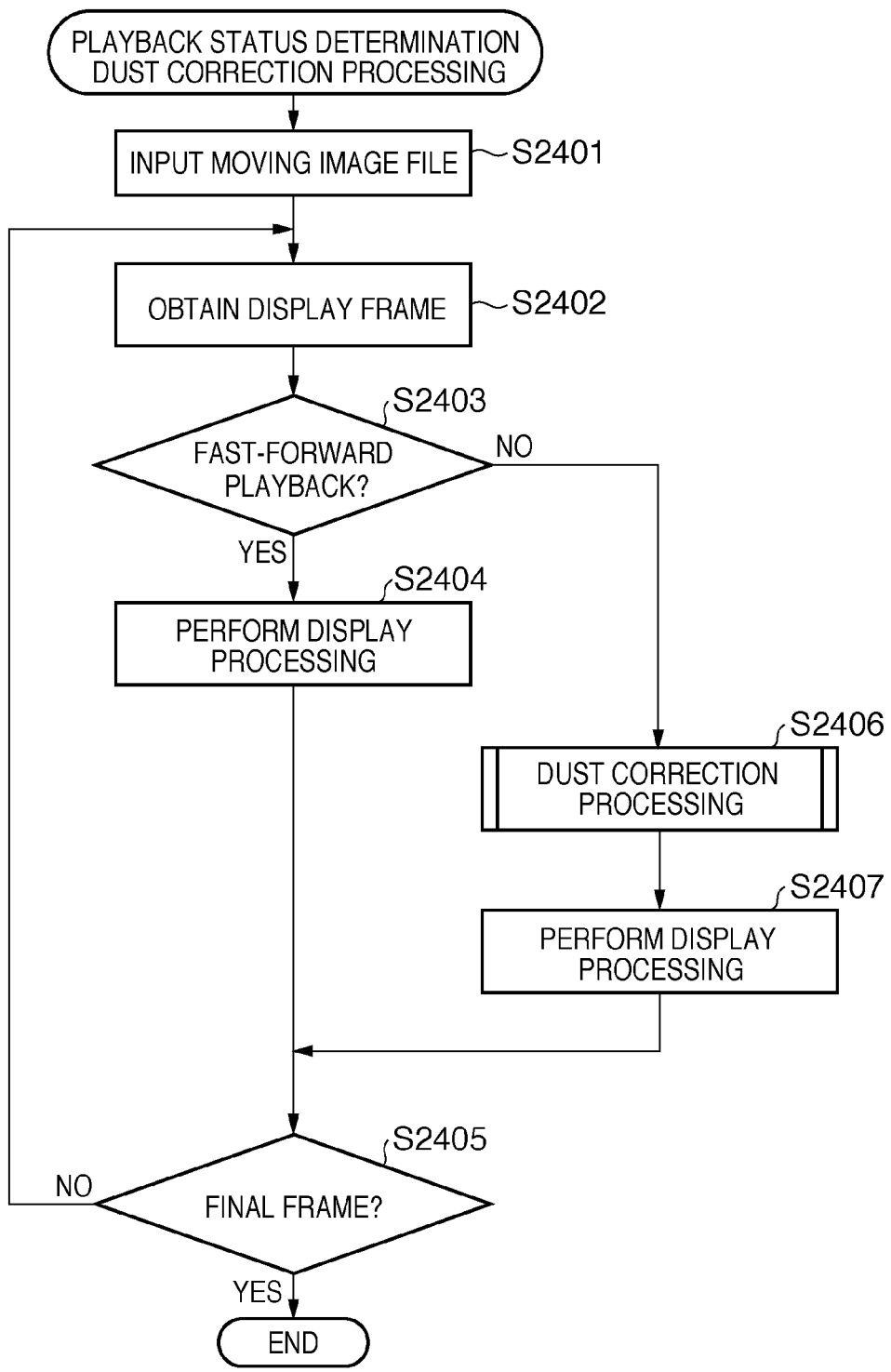
FIG. 24 is a flowchart for explaining playback status determination dust correction processing in the fifth embodiment.

FIG. 24 shows the sequence of playback status determination dust correction processing in the fifth embodiment. The sequence of playback status determination dust correction processing in fast-forward playback will be explained with reference to FIG. 24.

The sequence up to step S2402 in FIG. 24 is the same as that up to step S1702 in FIG. 17.

If it is determined in step S2403 that the user has pressed a fast-forward playback button 1608, display processing is done (step S2404). In step S2405, it is determined whether the current frame is a final one. If the current frame is a final one, the playback status determination dust correction processing ends. If the current frame is not a final one, the process returns to step S2402 and is repeated.

If it is determined in step S2403 that the user has not pressed the fast-forward playback button 1608, dust correction processing is performed in step S2406. In step S2407, the same display processing as that in step S1707 in the first embodiment is executed.

The first to fourth embodiments have mainly described a playback status in which dust correction is done. To the contrary, the fifth embodiment determines a playback status in which no dust correction is executed. A feature of the fifth embodiment is that when fast-forward playback is performed, no dust correction is executed because the user does not notice dust and no dust need be corrected.

As for fast-reverse playback, almost the same processing as that for fast-forward playback is applied. If it is determined that the user has pressed a fast-reverse playback button 1609, no dust correction is executed.

As described above, the fifth embodiment can increase the operating speed and reduce the amount of a resource such as memory used by performing no dust correction in playback such as fast-forward playback or fast-reverse playback in which a moving image file such as an MP4 file is played back such that the user does not view an image carefully for a long time, that is, in a playback status in which no dust stands out.

Sixth Embodiment

In the first to fifth embodiments, a moving image is played back in a separately prepared image processing apparatus. It is also possible to incorporate a similar image processing apparatus in an image capturing apparatus, perform the same processing, and play back a moving image file such as an MP4 file in the image capturing apparatus while performing dust correction processing using dust information. Even the sixth embodiment can increase the operating speed and reduce the amount of a resource such as memory used in moving image playback. Also, the sixth embodiment can provide the user with a high-quality image in which the shadow of conspicuous dust or the like is corrected.

Other Embodiments

The objects of the embodiments are also achieved by the following method. A storage medium (or recording medium)

which stores software program codes to implement the functions of the above-described embodiments is supplied to a system or apparatus. The computer (or CPU or MPU) of the system or apparatus reads out and executes the program codes stored in the storage medium. In this case, the program codes read out from the storage medium implement the functions of the above-described embodiments. The storage medium that stores the program codes constitutes the present invention. The functions of the above-described embodiments are implemented not only by causing the computer to execute the readout program codes. The present invention also includes a case wherein the operating system (OS) or the like running on the computer executes part or all of actual processing on the basis of the instructions of the program codes, thereby implementing the functions of the above-described embodiments.

The present invention also incorporates the following case. More specifically, the program codes read out from the storage medium are written in the memory of a function expansion card inserted into the computer or the memory of a function expansion unit connected to the computer. The CPU of the function expansion card or function expansion unit executes part or all of actual processing on the basis of the instructions of the program codes, thereby implementing the functions of the above-described embodiments.

The storage medium to which the present invention is applied stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-110472, filed Apr. 21, 2008, which is hereby incorporated by reference herein in its entirety.

What is claimed is:

1. An image processing apparatus comprising:
    an acquiring unit which acquires moving image data in which a shadow of a foreign substance adhered to a surface of an optical member of an image capturing apparatus is captured and foreign substance information including information of a position and size of the foreign substance;
    a correction unit which corrects the shadow of the foreign substance in each frame of the moving image data by using the foreign substance information acquired by said acquiring unit;
    a playback unit which plays back the moving image data; and
    a control unit which controls the acquiring unit, the correction unit and the playback unit, wherein the control unit controls the acquiring unit, the correction unit and the playback unit so as to correct the shadow of the foreign substance in a playback frame to be played back when the playback status of the moving image data is slow-motion playback, and wherein the control unit controls the acquiring unit, the correction unit and the playback unit so as not to correct the shadow of the foreign substance in a playback frame to be played back when the playback status of the moving image data is either of fast-forward playback and fast-reverse playback.

2. The image processing apparatus according to claim 1, wherein the control unit controls the acquiring unit, the correction unit and the playback unit so as to correct the shadow of the foreign substance in a playback frame to be played back when the playback status of the moving image data is pause.

3. The image processing apparatus according to claim 1, wherein the control unit controls the acquiring unit, the correction unit and the playback unit so as to correct the shadow of the foreign substance in an arbitrary playback frame to be played back when the playback status of the moving image data is pause.

4. The image processing apparatus according to claim 3, wherein the arbitrary playback frame includes a playback frame which has already been played back.

5. The image processing apparatus according to claim 1, wherein the control unit controls the acquiring unit, the correction unit and the playback unit so as to correct the shadow of the foreign substance in a playback frame to be played back when the playback status of the moving image data is either of forward frame advance and reverse frame advance.

6. The image processing apparatus according to claim 1, wherein the image processing apparatus is arranged in the image capturing apparatus.

7. A method of controlling an image processing apparatus which has a processing unit, the method comprising:
    acquiring moving image data in which a shadow of a foreign substance adhered to a surface of an optical member of an image capturing apparatus is captured and foreign substance information including information of a position and size of the foreign substance;
    correcting by said processing unit the shadow of the foreign substance in the moving image data by using the foreign substance information stored; and
    playing back the moving image data;
    wherein when the playback status of the moving image data is slow-motion playback, the correction of the shadow of the foreign substance in a playback frame to be played back is performed, and wherein when the playback status of the moving image data is either of fast-forward playback and fast-reverse playback, the correction of the shadow of the foreign substance in a playback frame to be played back is not performed.

8. The method according to claim 7, wherein the correction of the shadow of the foreign substance in a playback frame to be played back is performed when the playback status of the moving image data is pause.

9. The method according to claim 7, wherein the correction of the shadow of the foreign substance in an arbitrary playback frame to be played back is performed when the playback status of the moving image data is pause.

10. The method according to claim 9, wherein the arbitrary playback frame includes a playback frame which has already been played back.

11. The method according to claim 7, wherein the correction of the shadow of the foreign substance in a playback frame to be played back is performed when the playback status of the moving image data is either of forward frame advance and reverse frame advance.

12. An image processing apparatus comprising:
    a processing unit which performs (i) acquiring moving image data in which a shadow of a foreign substance adhered to a surface of an optical member of an image capturing apparatus is captured and foreign substance information including information of a position and size of the foreign substance, (ii) correcting the shadow of the foreign substance in each frame of the moving image data by using the foreign substance information acquired in said acquiring step and (iii) playing back the moving image data,
    wherein the processing unit performs correcting the shadow of the foreign substance in a playback frame to be played back when the playback status of the moving image data is slow-motion playback, and wherein the processing unit does not perform correcting the shadow of the foreign substance in a playback frame to be played back when the playback status of the moving image data is either of fast-forward playback and fast-reverse playback.

13. The image processing apparatus according to claim 12, wherein the processing unit performs correcting the shadow of the foreign substance in a playback frame to be played back when the playback status of the moving image data is pause.

14. The image processing apparatus according to claim 12, wherein the processing unit performs correcting the shadow of the foreign substance in an arbitrary playback frame to be played back when the playback status of the moving image data is pause.

15. The image processing apparatus according to claim 14, wherein the arbitrary playback frame includes a playback frame which has already been played back.

16. The image processing apparatus according to claim 12, wherein the processing unit performs correcting the shadow of the foreign substance in a playback frame to be played back when the playback status of the moving image data is either of forward frame advance and reverse frame advance.

17. The image processing apparatus according to claim 12, wherein the image processing apparatus is arranged in the image capturing apparatus.

* * * * *